Oct. 11, 1960

W. H. BLASHFIELD 2,956,127

AUTOMATIC TELEPHONE SYSTEM

Filed Dec. 8, 1954

10 Sheets-Sheet 1

INVENTOR.
William H. Blashfield,
BY
Brown, Jackson, Boettcher & Dienner
Attys.

Oct. 11, 1960 W. H. BLASHFIELD 2,956,127

AUTOMATIC TELEPHONE SYSTEM

Filed Dec. 8, 1954 10 Sheets-Sheet 2

INVENTOR.
William H Blashfield,
BY
Brown, Jackson, Boettcher & Dienner
Attys.

INVENTOR.
William H Blashfield,
BY
Brown, Jackson, Boettcher & Dienner
Attys

INVENTOR.
William H. Blashfield,
BY
Brown, Jackson, Boettcher & Dienner
Attys.

Oct. 11, 1960 W. H. BLASHFIELD 2,956,127

AUTOMATIC TELEPHONE SYSTEM

Filed Dec. 8, 1954 10 Sheets-Sheet 5

INVENTOR.
William H Blashfield,
BY
Brown, Jackson, Boettcher & Dienner
Attys

Oct. 11, 1960 W. H. BLASHFIELD 2,956,127

AUTOMATIC TELEPHONE SYSTEM

Filed Dec. 8, 1954 10 Sheets-Sheet 6

INVENTOR.
William H. Blashfield
BY
Brown, Jackson, Boettcher & Dienner
attys

Oct. 11, 1960 W. H. BLASHFIELD 2,956,127

AUTOMATIC TELEPHONE SYSTEM

Filed Dec. 8, 1954 10 Sheets-Sheet 7

INVENTOR.
William H Blashfield,
BY
Brown, Jackson, Boettcher & Dienner
attys.

Oct. 11, 1960 W. H. BLASHFIELD 2,956,127

AUTOMATIC TELEPHONE SYSTEM

Filed Dec. 8, 1954 10 Sheets-Sheet 8

INVENTOR.
William H. Blashfield,
BY
Brown, Jackson, Boettcher & Dienner
Attys.

Oct. 11, 1960 W. H. BLASHFIELD 2,956,127

AUTOMATIC TELEPHONE SYSTEM

Filed Dec. 8, 1954 10 Sheets-Sheet 9

INVENTOR.
William H Blashfield
BY
Brown, Jackson, Boettcher & Dienner
Att'ys

INVENTOR.
William H Blashfield,
BY
Brown, Jackson, Boettcher & Dienner
Attys 2,956,127

AUTOMATIC TELEPHONE SYSTEM

William H. Blashfield, Galion, Ohio, assignor to North Electric Company, a corporation of Ohio Filed Dec. 8, 1954, Ser. No. 473,825

19 Claims. (Cl. 179—7.1)

The present invention relates to automatic telephone systems, and particularly to marking means which are adapted for use in various switching arrangements in automatic telephone systems.

Automatic telephone exchanges are basically comprised of a large number of switching units which are adapted to automatically extend connections between associated subscribers as well as to subscribers of distant exchanges. The switching equipment utilized in the extension of calls between subscribers will vary somewhat with the nature of the special services which are to be provided for the subscribers. Certain exchanges, for example, are equipped with automatic toll ticketing equipment, which permits the extension of calls to other exchangers by merely dialing an assigned code number followed by the number of the desired subscriber in such exchange. In many installations of this type, the rates for each three minutes of conversation vary in accordance with the particular one of the remote exchanges which has been selected, and in such cases the exchange must include so-called "rate determination equipment" which is capable of assigning the proper billing rate to a toll call as made. In certain embodiment the rate to be charged will also vary with the time of day of the call, and the rate determination equipment must be operative in such cases to make such additional determination.

In the provision of toll ticketing arrangements of this nature, it is frequenly desirable from an economic standpoint to restrict subscribers of certain groups from free access to such service. One particular example is evidenced in the case of business establishments wherein the employees have access over the local P.B.X installation to outside lines, and accordingly would have free access to toll exchanges. Such arrangement would, of course, be resrtictive from an economic standpoint in large establishments. It is therefor customary to include in such exchanges so-called "restriction and non-restriction equipment" which causes each outgoing call to be examined as initiated and to be terminated in the event it is a call which is of the restricted class. Such equipment is also frequently utilized in other field applications, as for example, in exchanges having nation-wide dialing facilities.

A further switching arrangement common to automatic exchanges which include equipment for automatically extending calls to distant exchanges is conventionally known as register-translator equipment. In such arrangement registers are provided in the exchange for temporarily registering and storing the designation digit and the line number digit of a required connection so that translating means connected to the register may translate the destination digits into routing digits for effecting a more expedient extension of the connection to the exchange networks.

A further switching arrangement which is common to most exchanges is known as "intercepting means." Such equipment basically comprises means for intercepting certain calls, as for example calls to subscriber members which have been changed, and returning busy tone to the calling subscriber or routing the call to intercept equipment in a manner which is well known in the art.

It is apparent from the foregoing description that in the installation of toll ticketing arrangements and other types of special service exchange operators are faced with the necessity of including a large number of complicated and expensive switching arrangements. In addition to being prohibitive in many cases from an economic standpoint, the varied nature of the switching arrangement seriously increases the problems incident to maintenance and installation work. It is a primary object of this invention therefore, to provide a basic switching equipment which is readily adapted for use in an exchange to provide (1) restriction and non-restriction of calls (2) interception of calls (3) routing translation of calls, and (4) rate determination for billing calls. Various other applications of the novel switching arrangement having this indicated flexibility will, of course, be immediately apparent from the following description.

Figure 1A illustrates a marking arrangement for effecting restriction, non-restriction or interception; Figure 1B illustrates an alternative control arrangement for use with the novel marking arrangement of Figure 1A. Figure 2A illustrates schematically the switching equipment used in one of a number of conventional exchanges and Figure 2B illustrates a novel arrangement as adapted for use in the routing translation arrangement of Figure 2A; Figure 3 illustrates a novel marking arrangement which may be adapted for use in rate determination in conjunction with a system in which the cost of the call is entered on a primary record pursuant to the call, and alternatively in a system in which an analyzer determines the rate used to compute charges from information recorded on a tape;

Figure 6:
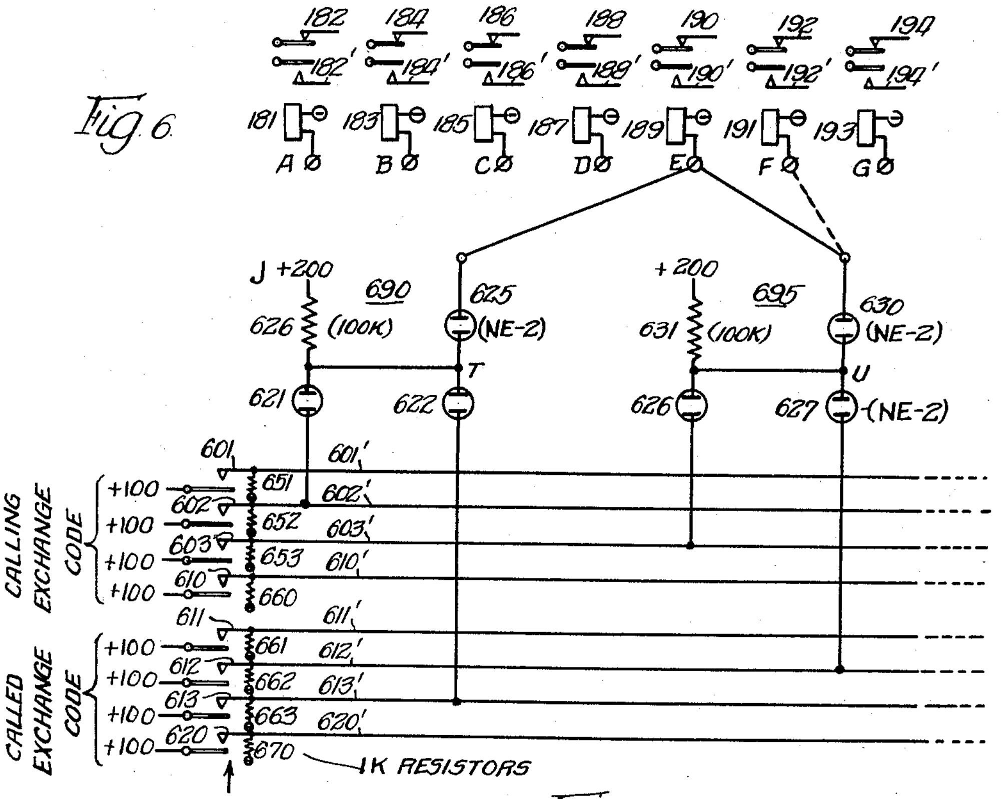
Figure 7:
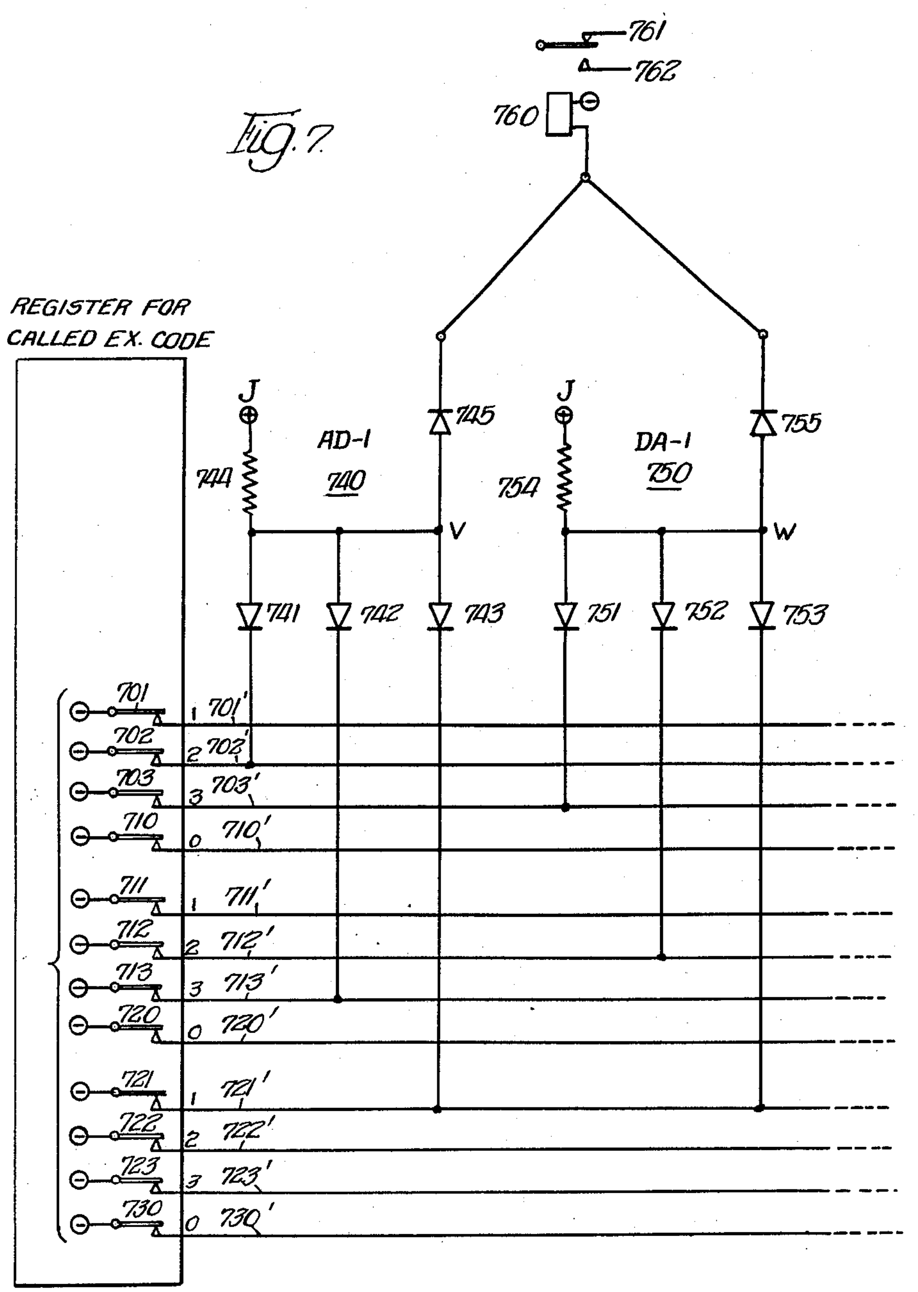
Figure 8A:
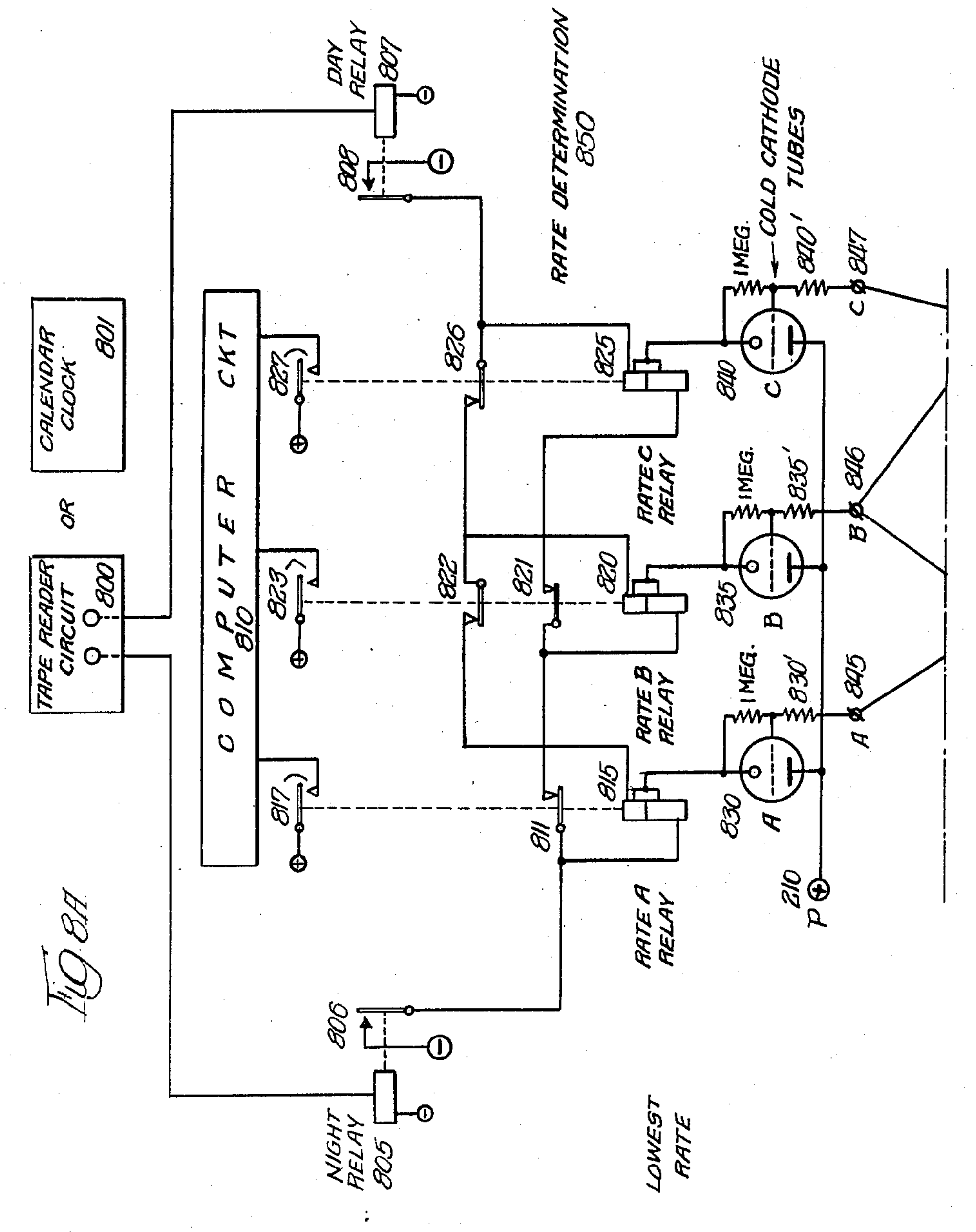
Figure 8B:
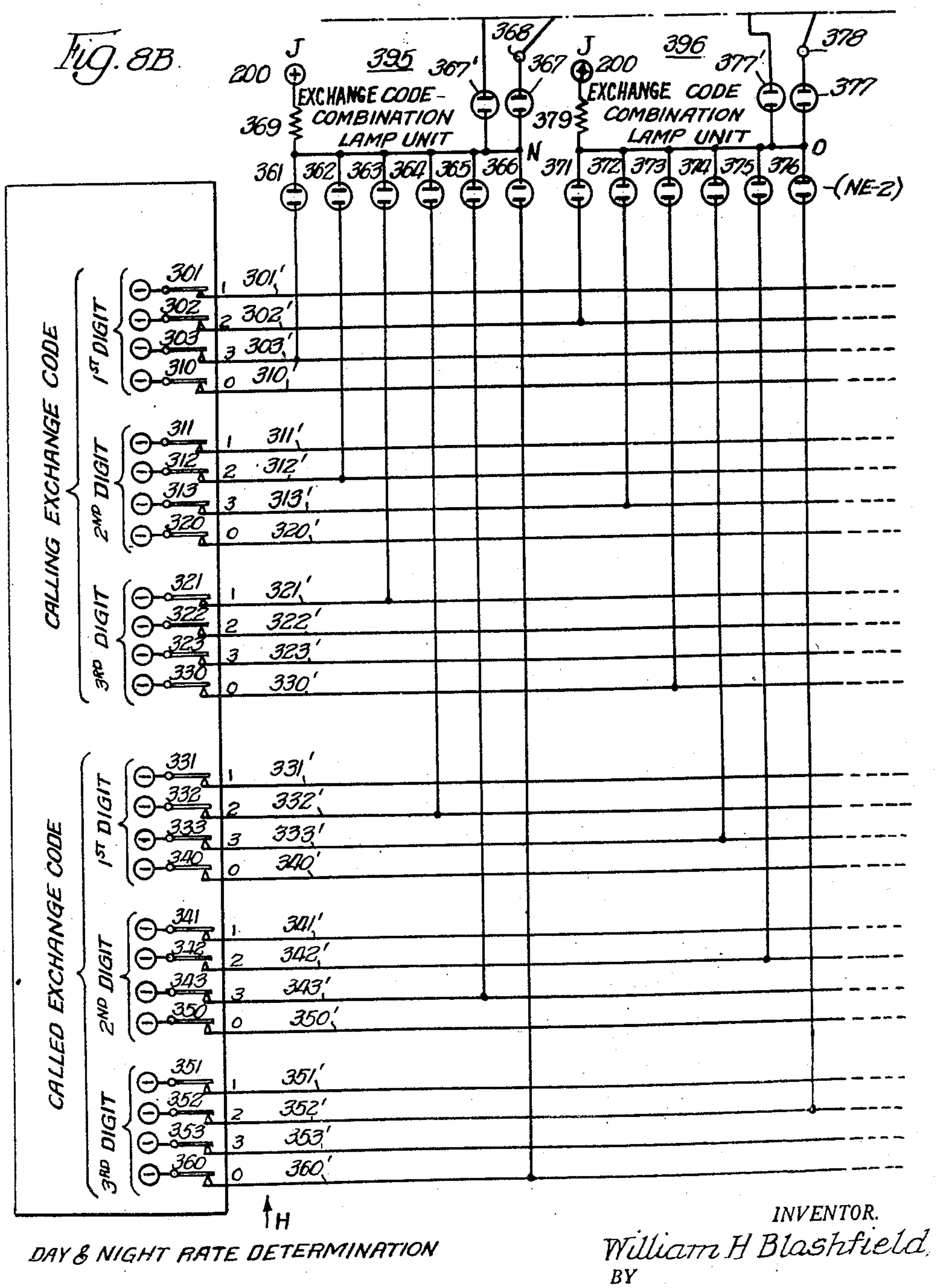
Figure 9:
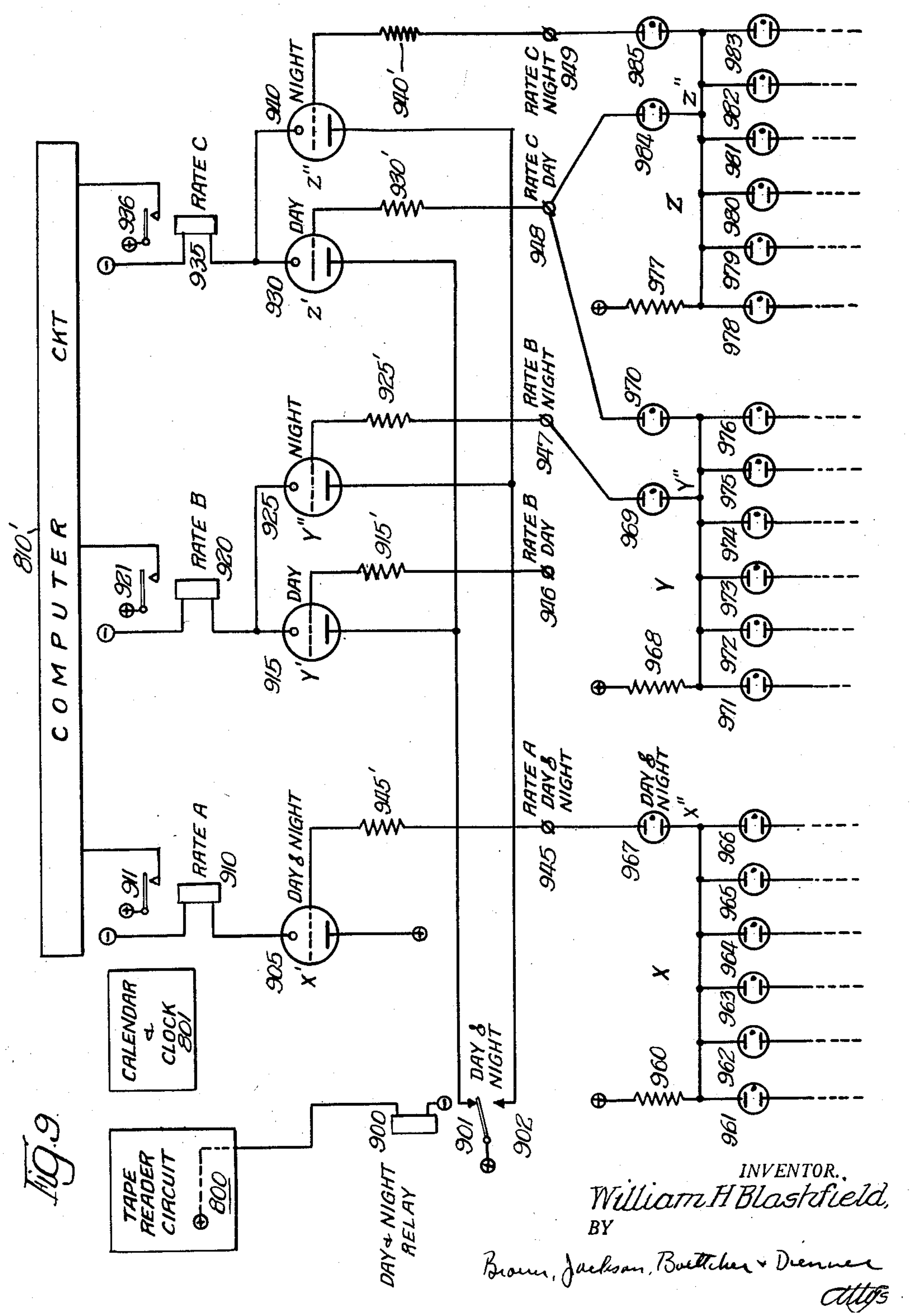

Figure 6 sets forth a basic circuit arrangement alternative to that shown in Figures 1–5; Figure 7 sets forth a marking arrangement utilizing rectifier units in lieu of the neon gas tubes shown in the marking arrangements of Figures 1–6;

Figures 8A and 8B set forth a marking arrangement for use in selecting day and night rates; and Figure 9 sets forth an arrangement alternative to that set forth in Figures 8A and 8B.

The basic circuit arrangements of the present disclosure are basically comprised of a number of symmetrical two-element gas tubes of the NE–2 type, and are similar to the switching arrangements known in the art as "coincidence" or "and" circuits wherein non-symmetrical variators are commonly used. Briefly described, a "coincidence" or "and" circuit is known in the art as a circuit in which a circuit having an output and a multiplicity of input circuits so arranged that the output circuit is energized when and only when a definite set of input conditions are met.

In a first application the novel marking equipment of the invention is utilized to provide restriction and non-restriction of calls by the subscribers of an exchange. As set forth in more detail in the copending application which was filed July 13, 1954 by Crow et al., and which received Serial No. 443,068, certain metropolitan areas have automatic toll ticketing facilities including toll ticketing trunk equipment which permits subscribers to dial certain outlying suburban areas directly. The equipment is thereupon operative to make a record of the call for use in subsequent billing of the calling subscriber.

In a business organization having a private branch exchange wherein the parties of the exchange have direct access to the city trunks, the parties of course will also be able to extend calls over their sets to the toll ticketing trunks and the charge for such call will be billed to the exchange. In organizations having a large number of employees, such arrangement would be extremely costly. It is therefore frequently desirable in such arrangements to block such calls as are attempted to certain of these toll exchanges by the subscribers. As taught in the copending application restriction may be accomplished by noting on suitable marking equipment that certain of the exchanges are to be restricted, and then examining the exchange code of each call as dialled and comparing same with the marking equipment as to the status of the code dialled. Thus, in nation-wide toll dialing having the 2–5 numbering scheme certain of the three-digit exchange codes will be accessible to calling subscribers, and other of the three digit exchange codes will be restricted to the subscriber. Considering eight possibilities for the first of the three digits, eight for the second digit (in that "1" or "0" not used for the second digit except in very special cases) and ten for the third digit, it will be apparent that eight times eight times ten will result in 640 permutation possibilities; that is, 640 three-digit exchanges, which may be classified in this manner. Certain of this group are to be restricted, and others are to be accessible to the calling subscribers. Inasmuch as the number of three-digit exchange codes to which subscribers are allowed access is normally very much less than the number to which they are denied access it is advantageous in most instances to mark for the exchanges which are not to be restricted. Accordingly, the illustrated arrangement in Figure 1 sets forth a control relay which, when operated, will permit extension of a call initiated by a subscriber to the desired exchange. It is apparent, however, that the relay illustrated can likewise be designated as a restriction relay and with the operation of the restriction relay the subscriber would be denied access to the exchange dialed.

It will also be apparent that although the illustrated arrangement is described in relation to restricting or non-restricting private branch exchange subscribers at a private branch exchange, the same principles may be applied to marking of calls originated by metropolitan subscribers.

Figures 1A, 1B:
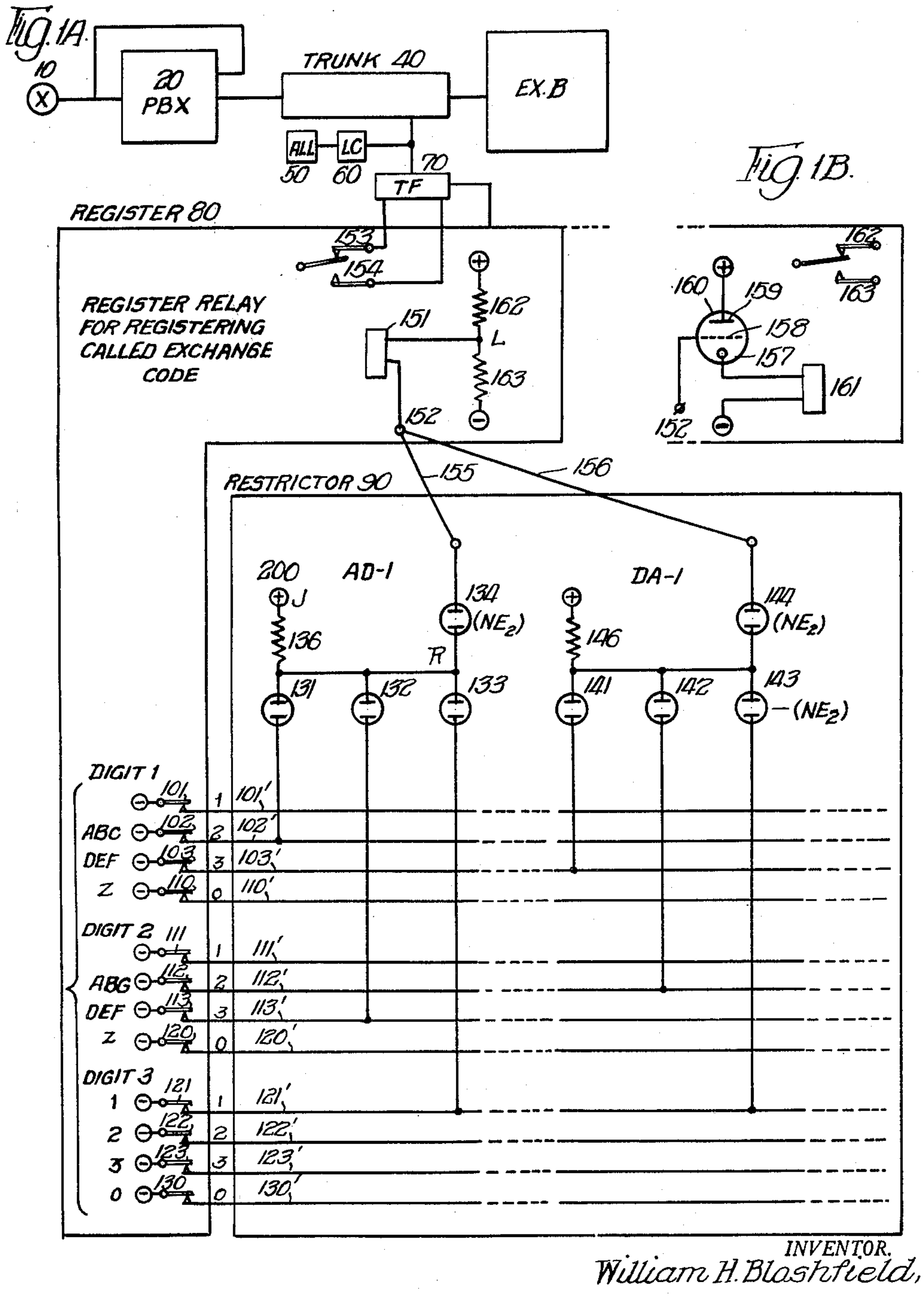

With reference to Figure 1A the novel marking means of the invention as utilized in restriction and non-restriction application is shown thereat. Specifically, the restrictor 90 is included in an exchange similar to that set forth in the aforementioned copending application which may comprise a private branch exchange 20 which is adapted to serve a number of subscriber substations, one of which is illustrated generally at 10, over preassigned levels 1–8 of the P.B.X equipment, and which includes means for extending communication connections between subscribers of the P.B.X equipment and subscribers of a remote exchange B, level 9 and associate trunk equipment such as illustrated at 40 being assigned for such purpose. Other details of the P.B.X arrangement not pertinent to the invention may be found in the copending application.

The novel restrictor equipment 90 which is operative to check each of the calls extended over the trunks, such as illustrated trunk 40, basically comprises a line circuit such as illustrated line circuit 60. A number of trunk finders, such as illustrated trunk finder 70, a guard and allotter circuit such as illustrated circuit 50, for guarding against seizure of more than one trunk at a time, a plurality of register circuits such as illustrated register circuit 80, which are accessible to the associated trunks 40, and at least one restrictor circuit such as illustrated circuit 90, are accessible to the register circuits 80.

For purposes of simplicity the trunk 40, line circuit

60, guard and allotter circuit 50, and trunk finder 70 have been illustrated in schematic block form. For similar reasons, the details of register circuit 80 have been omitted, and only those portions which are pertinent to the invention have been included in Figure 1A.

The pertinent portions of the register 80 basically comprise a set of marking contacts, such as illustrated contacts 101—130 associated with three sets of register relays in the register 80, the first set being operative to register the value of the first digit of the called exchange code, the second set being operative to register the value of the second digit of the exchange code, and the third set being operative to register the third digit of the exchange code, and a non-restriction control relay 151 which is controlled responsive to receipt of the appropriate signal from the restrictor 90 to extend a signal back over the seized trunk finder 70 to the trunk finder 40 for the purpose of effecting further extension of the call.

The restrictor 90 is also shown schematically for the purpose of more clearly explaining the basic concepts of the invention. As shown in Figure 1A, the register relay sets normally connect negative potential to each of the marking conductors such as 101′—130′, and these conductors are extended from the register 80 to the restrictor 90.

Each called exchange in the system which is to be rendered available to the subscriber, such as X, is assigned a set of three guard tubes 131, 132 and 133 arranged with a master control tube 134 in a "coincidence" circuit to extend a signal over a conductor, such as 155, to a control relay, such as 151, in the register 80. In the present example, the first illustrated guard arrangement is comprised of tubes 131—134 which have been assigned to render the exchange having code AD–1 accessible to the subscriber. Accordingly, guard tubes 131—133 will have one electrode each connected to the marking conductors 102′ (ABC for first digit), 113′ (DEF for second digit), and 121′ (digit 1 for third digit) respectively. The second electrode of the guard tubes 131—133 is connected over a common lead resistor 136 to a source of potential J (which in the present arrangement is in the order of 200 volts positive).

As a result at least one of the tubes 131, 132, 133 will be normally fired and the potential value at the common terminal R therefore, will be in the order of 60 volts positive.

The master guard tube 134 for the lamp group 131—133 associated with code AD–1 is connected in series with a control relay 151 between the source J and a voltage divider 162, 163, which supplies a potential in the order of 10 volts at point L. Since tube 134 has a firing voltage of approximately 70 volts, (70 volts firing, 60 volts sustaining are typical average values) the differential normally applied thereto (60 volts minus 10 volts) will be insufficient to cause same to strike.

It is apparent from the foregoing that at least one tube of each lamp group such as 131—133 is normally fired and the master lamp of the group is extinguished. It will be further apparent to parties skilled in the art that all three lamps of each group such as 131—133 may be considered as being fired. Briefly, assuming tube 131 is the fired tube of group 131—133, if negative potential is removed from conductor 102′, lamp 131 will extinguish and the potential at point R tends to rise toward the value of the source J (200 volts). However, as the voltage at point R is approximately 70 volts tube 132 or 133 will fire and the tube 134 will still be inhibited (tube 134 has 10 volts connected to its cathode and accordingly, there will be only a 60 volt differential across tube 134 when the differential across tubes 132 and 133 is 70 volts). It is apparent therefore, that the electrodes of all three tubes of a group before the master lamp associated therewith will fire.

The guard group consisting of lamp 141—143 have been assigned to the exchange having code DA–1 and the guard tube 141—143 will be connected to the conductors 103′, 112′ and 121 in the manner shown.

The manner in which the illustrated equipment operates to provide restriction and non-restriction with the initiation of a call by a subscriber to a restricted and a non-restricted exchange will now be described.

In the initiation of a call by a calling subscriber such as X, to a non-restricted exchange such as AD–1, the subscriber indicates the call by removing his handset from its associated sub-station set and dialing the trunk code digit "9".

Assuming the illustrated P.B.X operates in the conventional manner the line of the calling subscriber is seized and extended by way of suitable switching equipment to effect seizure of an idle trunk associated with the ninth level, such as illustrated trunk 40. Trunk circuit 40 operates to energize an associated line circuit, such as illustrated at 60, which, in cooperation with the guard circuits effects seizure of an idle one of the trunk finders such as illustrated trunk finder 70. The trunk finder 70 operates in a conventional manner to find the calling trunk, and connects the same to an idle one of a group of associated register circuits, such as illustrated register circuit 80.

As the calling party X dials the first three digits of the called party number (AD–1 in the present example) the digit representing impulses are transmitted over the seized trunk to the illustrated register circuit 80.

Register circuit 80 registers the three-digit code as received on its associated register sets, letter A being registered on the first set, letter D being registered on the second set, and number 1 being registered on the third set.

As a result of the registration of the called exchange code on the register in this manner, contacts 102, 113 and 121 will be operated to interrupt the negative battery which is supplied to the associated marking conductors 102′, 113′ and 121′ and thereby indicate to the restriction equipment 90 that the code of the desired exchange is AD–1.

As noted above the guard tubes 131, 132, 133 are considered to be normally operated. However, with the registration of the called exchange code AD–1 on the marking conductors 102′, 113′ and 121′ and the consequent removal of negative potential therefrom, guard tubes 131, 132, 133 will of course, be extinguished, and the potential at point R will rise toward the value of the potential source J (which is 200 volts). As the potential difference across the master tube 134 becomes greater than 70 volts (approximate firing value of NE–2 tubes) the master tube 134 will fire and an operating circuit is thereby completed for non-restriction relay 151, which circuit extends from negative potential over resistor 163, the winding of relay 151, master guard tube 134, and resistor 136 to positive potential. Non-restriction relay 151 operates and at its contacts 154 signals associated equipment in the trunk 40 in the manner illustrated in the aforementioned copending application to thereby condition the trunk for extension of the calling tube to further call-extending equipment.

It is apparent that as master guard tube 134 fires the potential at terminal 152 will rise to a slightly higher value, and the master tube, such as 144, associated with other exchange codes will be further inhibited.

In the event that the called exchange code DA–1 is dialed guard tubes 141, 142, 143 will be operative in a similar manner to effect the firing of the master guard tube 144, which will in turn operate in the manner of tube 134 to accomplish a non-restriction operation. The operation of the guard tubes for the other exchanges will be obvious from the foregoing description.

As the register 80 and restrictor 90 are restored, negative potential is reapplied to the marking conductors 101′—130′ and the guard tubes assume their normal condition.

With reference to Figure 1B, there is shown thereat an alternative arrangement wherein a cold cathode tube 160 of the 5823 type may be used in lieu of control relay 151. As there shown, the cold cathode tube comprises a plate 159, a control grid 158 and a cathode 157, the control grid 158 being connected to multiple terminal 152 which extends to the master tubes for each of the exchange guard arrangements. Cathode 157 is connected through relay 161 to negative potential, and anode 159 is connected to positive potential of a value which cooperates with the tubes NE–2 and 5823 as shown.

As a master tube, such as 134 or 144 operates, the value of the potential appearing at terminal 152 is increased in the manner heretofore described, and the control grid 158 of the cold cathode tube 160 is rendered more positive to cause the tube to strike. Control tube 160 in striking completes an operating circuit for the series connected control relay 161 which operates in a manner of the control relay 151 to condition the equipment for extension of the connection of a calling party to further call-extending equipment.

It will be apparent from the foregoing description that as a called exchange code number is registered it is checked against the data contained in the restrictor and if the called exchange is to be accessible to the calling party, four pre-assigned tubes are operative to cause the control relay 151 or control tube 160 to signal the trunk 40 that the call may be extended.

It is further apparent from the foregoing description that as calls are extended to a three-digit exchange which is restricted, and accordingly does not have an associated set of tubes such as 131—134 associated therewith, the control relay, such as 151 (or alternatively the control tube 160) will not operate, and the call will be restricted in the manner which may be similar to that set forth in the aforeidentified application.

The use of the arrangement set forth in Figures 1A and 1B as a means of intercepting calls, that is, for detecting such calls as are being made to an exchange or a subscriber number which has been recently changed will be obvious to parties skilled in the art, it being apparent that the control tube 160 or the relay 151 will in such cases be utilized to effect the return of busy tone or the routing of the call to a conventional type intercept arrangement.

As indicated earlier herein, the novel marking means of the invention may also be adapted for use in a routing translator arrangement. One of the functions of a routing translator unit is to detect, count and register the successive digits dialed by the calling subscriber, and upon examining the digits registered upon the register translator, to effect the transmission of a code number consistent with the number dialed which routes the connection over indicated switching equipment to the desired exchange. An illustration of the manner of operation of register translator equipment has been set forth in the application to Blachfield et al., having Serial No. 368,066 which is assigned to the assignee of this invention. In such arrangement the translator was effective responsive to dialing of the code trunk number to effect routing of the connection to the desired one of the exchanges during the period that the calling subscriber is dialing his own directory number. It should be understood, however, that the translator unit of the invention is operative with other types of register sender and recorder equipment, such arrangement having been cited merely as an example of its possible application. A further example of the manner in which the arrangement may be adapted for use is set forth in the periodical "Telephony" of May 15, 1954, on page 36, wherein six groups of digit leads are provided, the first three representing the three digits of the area code, and the last three representing the three digits of the exchange code.

In such arrangement each group of marking tubes would consist of six guard tubes connected to the six digit leads corresponding to their assigned number, instead of the illustrated arrangement in which the three guard leads are connected to their assigned leads. For purposes of simplicity in illustrating the novelty of this arrangement the invention is shown as used in conjunction with a three-digit group.

Figure 2A:
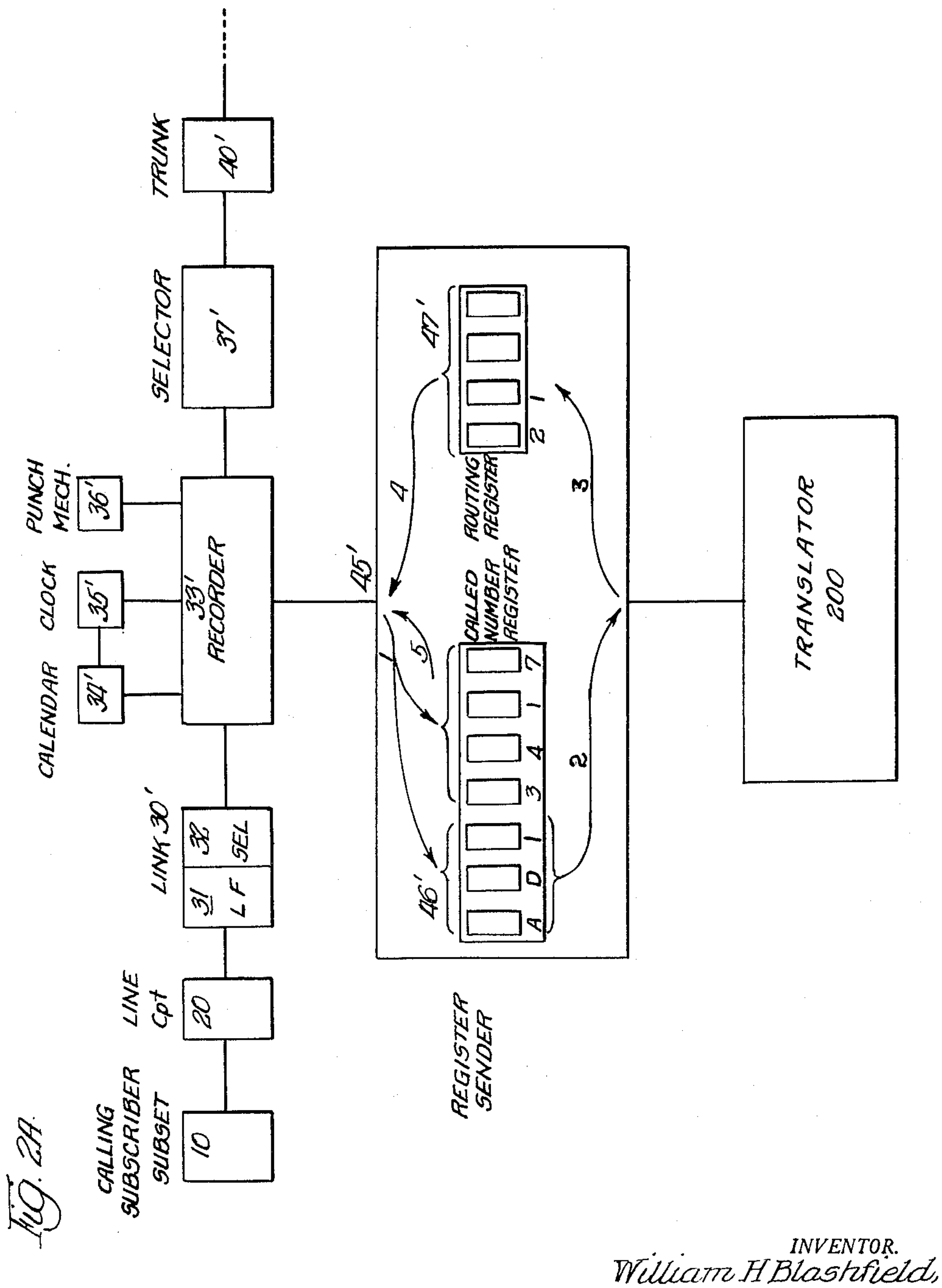

With reference to Figure 2A there is shown thereat an exchange arrangement in block form including the novel translator equipment. As there shown, the exchange comprises a number of substations, such as illustrated substation set 10 which has access over individual line circuits such as illustrated line circuit 20 to a group of associated line-finder selector links, such as the link illustrated generally at 30'.

The link equipment 30' in turn has access to a number of recorder units, such as illustrated unit 33'. Common equipment such as calendar 34', a clock 35' and punch mechanism 36' are associated with, and accessible to, the recorder units such as 33'.

Each recorder unit has access to register sender equipment, such as illustrated at 45', and a translator unit, such as illustrated at 200. The recorders 33' also have access over a selector group, such as illustrated at 37', to outgoing trunks such as shown at 40'.

The register relays 46' for registering the called number are operative at their contacts 241—270 (Figure 2B) to normally apply negative potential to each of a number of associated marking leads 241'—270', ten marking leads being assigned to a particular one of the three digits requested. The marking leads 241'—270' extend from the register sender 45' to translator 200.

Figure 2B:
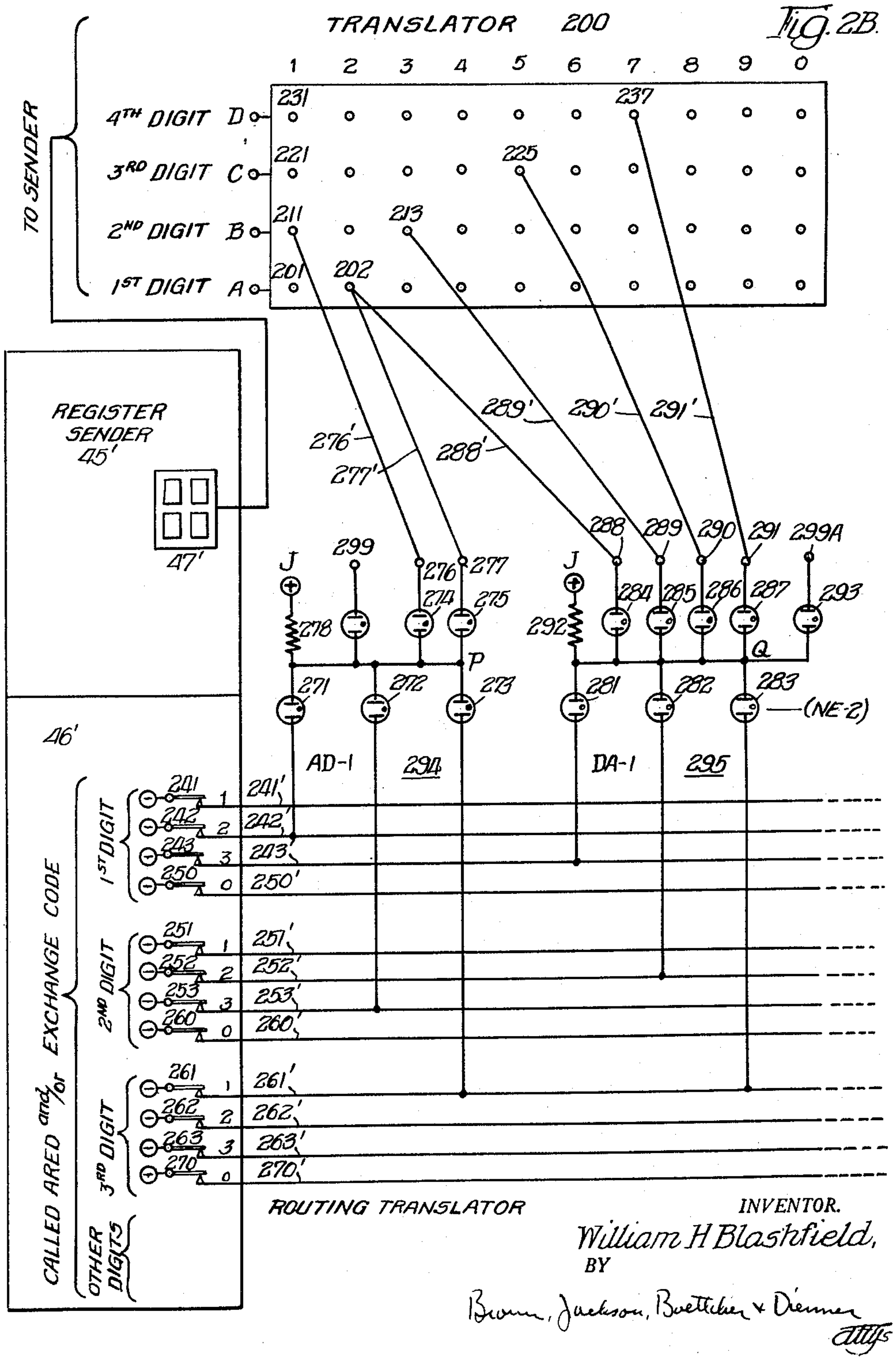

The routing translator 200 comprises a series of lamp groups such as 294 and 295, each lamp group including one master or guard tube for each digit of the called exchange code which is registered. As shown in Figure 2B the first lamp group comprises three tubes 271, 272, 273, of which a first lamp 271 is connected to the conductor 242' (ABC) associated with the first digit group; a second lamp 272 is connected to conductor 253' (DEF) associated with the second digit group; and the third lamp 273 is connected to a conductor 261' which is associated with digit 1 of the third digit group, whereby the lamp groups 271—273 are associated with the particular conductors which are marked whenever a call is extended toward the exchange having the code AD1. Guard lamps 271—273 have a second electrode connected over a common resistance 278 to a potential supply source J, which in the present arrangement is in the order of 200 volts positive.

As a result one of these lamps is normally fired and as noted in the description relative to Figure 1, the operation of the group is such that it may be properly assumed that all these lamps are fired. Master guard lamps 274 and 275 are connected between the common terminal P for the lamp group 271—273 and pre-assigned terminals on the translator 200, which tubes as operated, indicate to the sender via the terminals the nature of the routing digit to be transmitted. Thus in the illustrated arrangement the master guard lamps 274, 275 are connected to terminals 211, 202 and are operated in a manner that will cause the translator to indicate to the sender that digit "2" is to be transmitted as the first outgoing digit, and digit "1" as the second outgoing digit.

It will be apparent, by analogy, that lamp group 295 which consists of lamp 281, 282, 283, connected respectively, to conductors 243' (DEF), 252' (ABC) and 261' (digit 1) will be operative whenever the exchange having the code DA–1 is called. The master guard lamps 284—287 associated with lamp group 295 are connected to terminals 202, 213, 225 and 237, respectively, whereby the lamp group 295 as operated causes the translator 200 to indicate to the sender that digit "2" shall be transmitted as the first digit, digit "3" as the second digit, digit "5" as the third digit, and digit "7" as the fourth digit. The manner in which the equipment is operative to effect routing in this manner responsive to dialing of the exchange code number will not be described.

Assuming that the calling subscriber indicates a call in the conventional manner and that the illustrated link 30' has been assigned to the equipment for use in the call initiated, the linefinder switch finder 31 of the seized link 30' now operates to select the line of the calling subscriber and to connect same to the conductors of the associated selector switch 32 of the seized link 30'. As the line of the calling subscriber is seized and extended by way of finder switch 31 to the associated selector switch 32, it is marked as busy to the connector switches in the exchange to prevent seizure thereof by any of the other subscribers in the exchange during the extension of the call by the calling subscriber.

The calling subscriber now dials the desired trunk code (in the present Example 8) and control equipment in the seized link 30' automatically responds to the incoming impulses to select one of a group of recorders, such as illustrated recorder 33', which is associated with level eight of the selector switch 32. Assuming that the illustrated recorder unit 33' is seized by the calling subscriber in this manner, it is effective in turn to seize the associated selector equipment 37' and simultaneously, an associated group of register sender circuits, such as illustrated sender 45'. Assuming that the called party number is AD1–3417, the calling subscriber now dials such number and the recorder 33' effects operation of an associated punch mechanism, such as 36', to make a record of the called party number as received, and simultaneously, causes such number to be registered upon the register sender relays 46', which are assigned for such purpose.

The recorder is simultaneously operative to engage the translator 200, and connects the terminals A—D thereof to the routing register relays 47', the routing relays being connected to negative potential. The translator, with its connection to the routing register relays 47', effects instantaneous marking of the routing digit desired upon the register relays 47' and is immediately restored thereafter for use by others of the recorders in the exchange. The sender retains the markings which have been registered thereon, and effects the transmission thereof at a later time as directed by other control equipment in the exchange.

The specific operation of the translator 200 in effecting transmission of the routing digits 21 will now be described. With reference to Figure 2B and particularly the lower portion thereof, it will be apparent that as the called exchange codes, such as AD1, are dialed, negative potential will be removed from the marking leads 242', 253' and 261'.

Further, the sender will be operative at this time to connect the routing register relays 47' to the output terminals of the translator 200. With negative potential removed from the cathode of register tubes 271, 272, 273, which are connected to leads 242', 253' and 261', register tubes 271, 272, 273 are extinguished, and the potential at point P starts to rise toward the value of the source J. Inasmuch as register relays 47' and negative potential are connected to the terminals of the translator, the potential increases to a point where the difference across the electrodes of the marking tubes is in the order of 70 volts, and tubes 274 and 275 will fire and complete an operating circuit to the sender register relays 47' to register the value of the routing digits to be transmitted. In the present example, it has been assumed that routing digit "21" is to be transmitted whenever the exchange code AD1 is registered. Accordingly, master lamp 275 is connected to the second terminal (202) of the translator terminals associated with the first digit, and master lamp 274 is connected to the first terminal (211) associated with the second digit.

As the marking of the sender is completed, the translator is immediately released for use with other equipment in the establishment of further connections. Negative potential is reapplied to all of the marking conductors, and at least one of the lamps of each lamp group, such as 294, 295, is fired, and the master lamps, such as 274, 275, are extinguished. The sender unit sends the routing digit "21" as registered thereon at a time which is directed by further control equipment in the exchange.

In a typical installation, there may be a number of recorders, such as 33', a fewer number of senders, such as 45' and only one translator 200. It is, of course, apparent that the utilization of a single translator is desirable from an economical standpoint, especially since the translator is engaged for use only momentarily in the establishment of each connection.

As a further example, it will be assumed that the calling party dials DA1 or 321. As the area or exchange code DA1 is registered on the register sender relay 46', the contacts 243, 252 and 261 are operated to remove negative potential from the marking leads 243', 252', 261', whereby the guard tubes 281, 282, 283, which are assigned to the code number DA1, are extinguished. The potential at point Q tends to rise to the value of the potential of source J. As noted before, negative potential is connected over the register sender relays 47' to the translator terminals at this time. Thus, as the potential at point Q reaches the point at which the drop across the marking tubes 284, 285, 286 and 287 is greater than the striking voltage of the master tubes, the tubes will fire, and complete an operating circuit for the sender relay equipment which is connected to the terminals associated with the first, second, third and fourth digits. The translator is then released and the value of the digits registered on the sender will be transmitted for routing purposes as directed by further control equipment in the exchange. The routing number in the present example comprises a first digit "2," second digit "3," the third digits "5" and the fourth digit "7."

It is noted that the resistance value of each of the circuits which are connected to the translator terminals is chosen so as to be comparable to the value of resistors 278, 292, etc. As a result, the firing of one master tube of the group will not inhibit firing of the other master tubes in the same group.

In the event that dual code translation of the type mentioned previously is to be provided, the rise of potential at terminal Q will effect operation of a relay or cold cathode tube relay combination, such as relay 151 or tube 160 illustrated in Figures 1A and 1B, to intercept regular routing of a call (as would be appreciated by one skilled in the art), special routing of the call being accomplished as described above.

*Rate determination*

The novel marking means of the invention are also readily adapted to determine the rate for computing charges in accordance with the markings on called area or exchange code registers. There is set forth in Figure 3 one arrangement wherein each of a number of rate relays, such as illustrated relays 381—393, is connected to establish a predetermined rate for a call as operated, and the rate relays are controlled in their operation by marking means similar to that set forth in Figures 1A, 1B, 2A and 2B.

The rate determination arrangement may be used with the registers in a telephone exchange and may be operated incident to a call passing through the exchange, in which case the markings supplied by the arrangement indicate to a computer the value of the rate to be applied so that the proper charges may be printed or punched or otherwise indicated on the toll ticket at the completion of the call.

Figure 3:
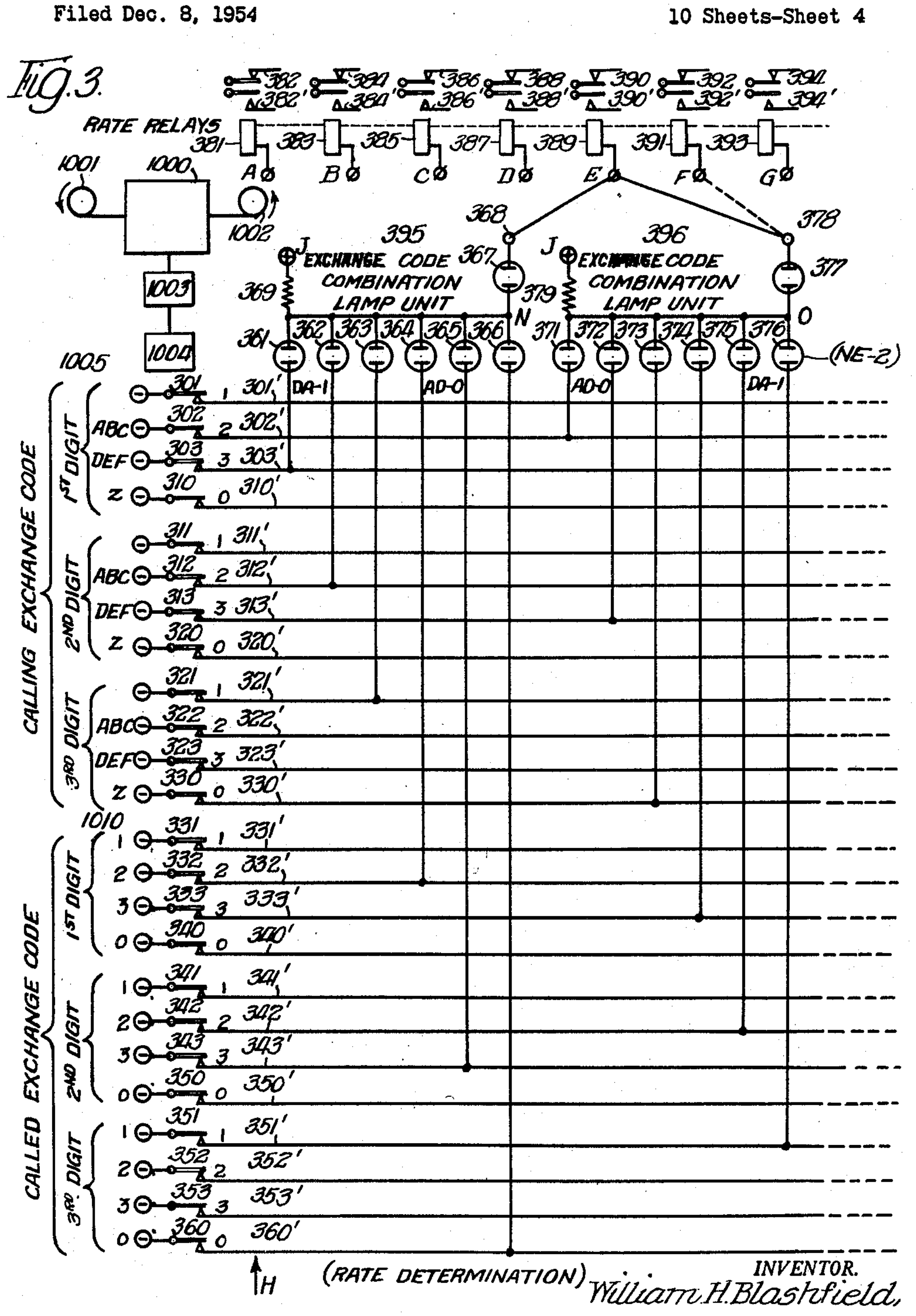

In a second embodiment the rate determination arrangement may be used with a scanner analyzing unit in the manner set forth in block form in Figure 3. As there shown, the arrangement basically comprises a scanner 1000 which is adapted to scan a toll ticketing member as it is moved from a first reel 1001 to a second reel 1002. A control circuit, including a counting chain 1003 and a steering circuit 1004, effects the registration of the calling number as it is scanned, a first set of register relays 1005 records the exchange digit of the calling number, and also effects the registration of the called number on a set of register relays 1010 which records the exchange digits of the called number.

In either application, the operation of the marking equipment will be similar. That is, it will be apparent with reference to Figure 3 and the foregoing description that the information input circuit comprises, in both applications, a set of registers upon which are registered the calling and called numbers respectively. In the arrangement illustrated, the register relays 1005 which register the calling numbers are arranged to control contacts 301—330 to mark conductors 301'—330' in the manner of arrangements in Figures 1A, 1B, 2A, and 2B, and the register relays which register the called number are arranged to control contacts 331—360 to mark conductors 331'—360'. The relays, in their normal condition, effect the connection of negative battery to marking conductors 301'—360'.

The rate determination unit includes a set of six lamps, such as 361—366 and 371—376 for each calling and called exchange. The cathodes of one set of three lamps in each group of six are connected to the marking leads which coincide with the calling exchange code represented thereby, and the cathodes of the other set of three lamps in each group of six are connected to the marking leads which connect with the called exchange code represented thereby. The plate electrode of each lamp of a set is connected over resistance 369, 379 to a potential source J. A master guard lamp, such as 367, 377 is connected to the multiple plate electrodes of each lamp set at its cathode, and the plate electrodes of the master guard tubes 367, 377, etc. are connected to the rate relay which corresponds to the rate to be charged whenever a call is made by a subscriber of the calling exchange represented by the first three lamps of the group to a subscriber of the called exchange represented by the second three lamps of the group.

In the present example, the rate relay 389 (rate E) is connected to be energized whenever a call is made by a subscriber in the exchange represented by the first three lamps of group 395 (DA1) to a subscriber in the exchange represented by the second three lamps of group 395 (AD0).

In more detail, assuming that a call is initiated by a party in the exchange having code DA1 to a subscriber in the exchange having code AD0, as the call is recorded upon the register relays associated with the calling and called exchange codes negative potential will be removed from the marking leads 303', 312', 321', 332', 343' and 360' in an obvious manner. As a result each of the tubes 361—366 is extinguished and the potential at point N tends to rise towards the value of supply source J; at such time as the potential at point N reaches the point where the potential drop across the master guard tube 367 is in the order of 70 volts, master guard tube 367 strikes and completes an operating circuit for the connected one of the rate relays (relay 389 in the present example). With the operation of the rate relay controlled by tube 367, the associated computer (or the marking unit for the toll ticketing equipment) is conditioned to use the preassigned rate in the determination of the charges (rate E in the present example).

It will be apparent that the lamp group 396 is operated in a like manner in the event that a call is made by a subscriber in the exchange having calling code AD0 to a subscriber in the exchange having code DA1. In such event the register relay will effect removal of the negative potential from marking conductors 302', 313', 330', 333', 342', 351'. With the removal of potential from these marking conductors, lamps 371—376 will be extinguished, and the potential at point O will tend to rise toward the value of the supply source J. As the potential approaches the point at which the potential drop across the master guard tube 377 is in the order of 70 volts the tube 377 will strike to complete an operating circuit for the rate relay connected thereto (relay 389 in the present example).

The manner in which such equipment may be utilized in the "2–5" numbering plan will be obvious from the following description. For the purpose of permitting nation-wide dialing, according to the "2–5" numbering plan, each office or exchange contains seven digit telephone numbers consisting of two letters and five numerals, as for example, AD1–2345. The two letters and first numeral (AD1) identify the particular office, and thus the particular city.

As presently developed, there are more than 640 offices in the nation. The country has therefore been divided into areas, each area being a state, the more heavily populated states being divided into two or more of such areas. Areas are assigned three digit numbers such as 503 for Oregon, 312 for Northeastern Illinois, etc. Area codes always consist of numerals (no letters) and always have "0" or "1" as the second digit. Office codes, on the other hand, consist of two letters and one numeral, and never have "0" or "1" as the value of the second digit.

The exchanges in different areas may have the same designation, as for example, there may be an office with the code AD1 in Chicago, and an exchange in the Oregon area with a code AD1. Obviously, if you dial AD1 from an office in the Northeastern Illinois area, the Chicago exchange will be seized. If you dial AD1 from any phone in Oregon, the Salem exchange will be seized. If a party in Chicago desires to call the AD1 exchange in Salem, Oregon, the digits 503–AD1 are dialed. The digits 503 (the area code) extend the call to Oregon, and the digits AD1 (the office code) effect extension on the call to Salem in Oregon. The last four digits dialed reach the particular subscriber in Salem having such digits assigned as his directory number.

In the event that the equipment of Figure 3 is to be utilized in a nation-wide arrangement, an additional three sets of leads will be supplied for the called area, the three sets of leads being similar, and in addition to, the three sets of leads which are illustrated in Figure 3 for the called exchange code. In a similar manner, there would be three more lamps in each lamp group connected to appropriate ones of the area leads so as to recognize the combination of called area and called exchange digits as dialed.

In the foregoing examples, it was assumed that the same rate E was to be applied in calls extended in both directions between the two exchanges. In the event that it is desired to apply a different rate in the case of a call from AD0 to DA1 than in the case of a call from DA1 to AD0, the output terminals associated with the two groups 395 and 396 would be connected to different rate relays. As an example, group 395 could be connected to rate relay E and group 396 could be connected to rate relay F. In such event a call in a direction from DA1 to AD0 would use rate E and a call from AD0 to DA1 would use rate F.

Figure 4:
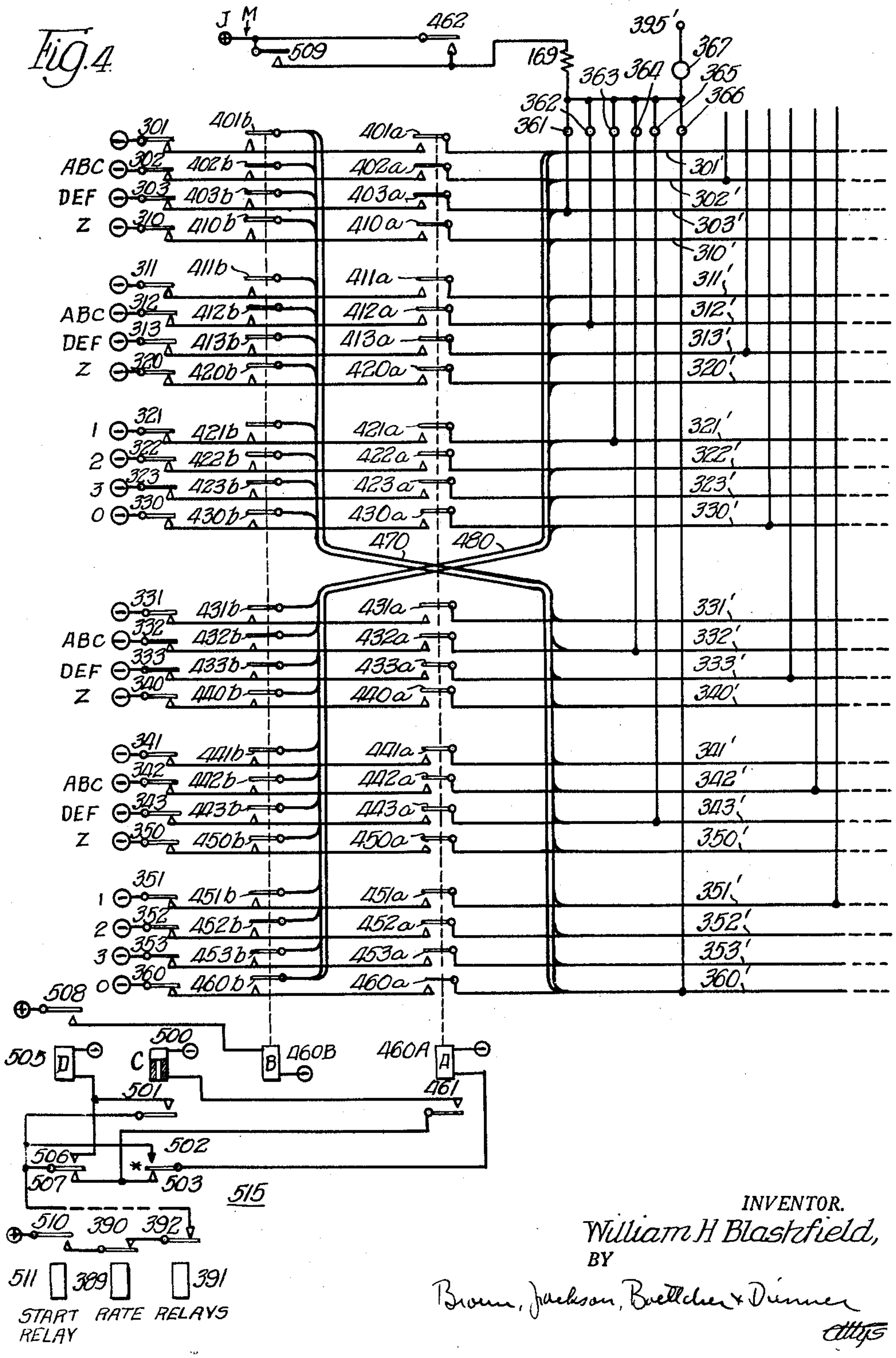
Figure 4 illustrates a lead reversing arrangement for use in the rate determination arrangement shown in Figure 3.
Figure 5:
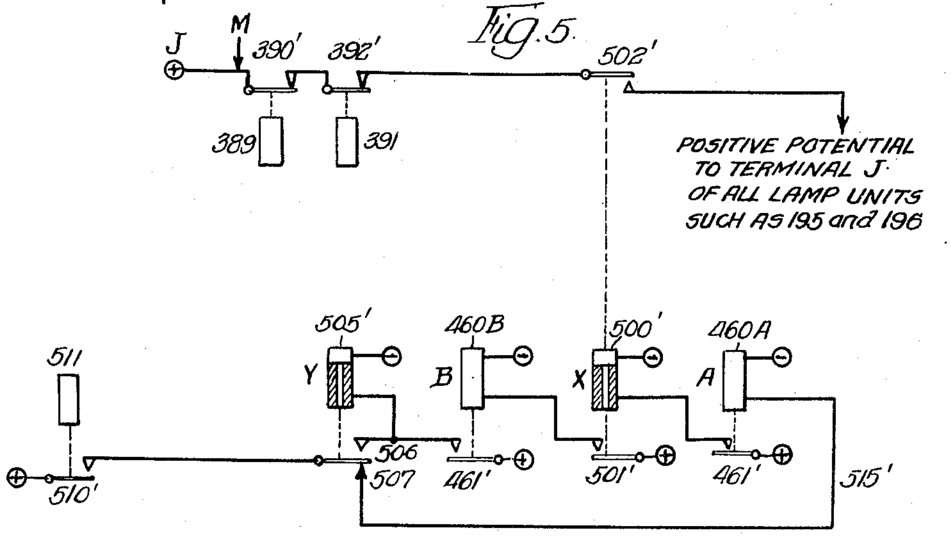
Figure 5 illustrates a control circuit for alternative use with the rate determination circuit set forth in Figure 4.

In the event that in any particular installation, calls between two exchanges in either direction use the same rate, a single set of lamps may be used for each two exchange combination, such arrangement being set forth in Figures 4 and 5. Such arrangement comprises, in essence, equipment for reversing calling and called leads as a second test for rate determination. More specifically, with this arrangement a lamp group, such as 395, can now handle calls in the direction from DA1—AD0 and also in the direction AD0—DA1.

With reference to Figure 4, it will be apparent that the arrangement is very similar to that of Figure 3, the disclosure basically comprising register equipment including contacts 301—360 for marking on marking leads 301'—360' the value of the calling-called numbers, and a single lamp group 395' which has its lamps 361—366 connected to determine the rate to be used in a call in either the direction DA1—AD0 or the direction AD0—DA1. The arrangement of Figure 3 is basically modified by the introduction of a control circuit comprising relays 460A, 460B, 500 and 505. As will be apparent from the following description, relay 460A is operative at its contacts to connect the calling and called register contacts to the marking conductors 301'—360' in the manner effected in Figure 3. Relay 460B which operates in sequence after relay 460A effects transposition of the contact connection to the marking leads, that is, the contacts 301—330 of the calling register are now connected to marking leads 331'—360' and marking contacts 331—360 are connected to marking leads 301'—330'. Thus as relay 460A operates the circuit effectively tests for the existence of a call in the direction DA1—AD0 and as relay 460B operates the circuit tests for the existence of a call in the direction AD0—DA1.

The control circuit comprised of relays 460A, 460B, 500 and 505 is in turn operatively controlled by rate relays 389, 391 and start relay 511 as set forth in more detail in the following explanation of the operation of the circuit in the establishment of an exemplary call.

Briefly, as a rate test is initiated, a start relay 511 in the register will operate, and at its contacts 510 will complete an operating circuit over contacts of certain rate relays (in the present example, 389, 391) specifically extending from negative battery over the winding of control relay 460A, contacts 503, 507, 392, 390 and 510 to positive battery.

Control relay 460A operates, and at its contacts 461 completes an operating circuit for slow to operate relay 500, and at its contacts 401*a*—430*a* connects the marking contacts 301—330 of the calling register to conductors 301'—330' (in the manner of Figure 3); and its contacts 431*a*—460*a* connects the marking contacts 331—360 to the marking conductors 331'—360' (in the manner of Figure 3), and at its contacts 462 connects a positive potential over resistance 169 to the plate electrodes of all lamp groups. At this time then the equipment is testing for the existence of a call in the direction DA1 to AD0. If the call is in such direction contacts 303, 312, 321, 332, 343 and 360 will be operated and the lamps 361—366 will extinguish. Master lamp 367 will effect the operation of rate relay 389 (rate E), and rate relay 389 at its contacts 390 interrupts the starting circuit for relay 460A to restore same. Relay 460A releases and in turn restores relay 500. Since the rate E has been assigned for the call, there is, of course, no reason for a further test.

However, if the call was in the opposite direction, as for example, the direction AD0—DA1, contacts 302, 313, 330, 333, 342, 351 will be operated. Accordingly, as relay 460A operates to connect these contacts to conductors 302', 313', 330', 333', 342', 351', the lamps will not be extinguished and a rate relay, such as 389, will not be operated.

Accordingly, as relay 500 operates in sequence after such test, it completes an operating circuit for associated relay 505, the circuit extending from negative battery over the winding of relay 505, contacts 501, 392, 390 and 510 to positive battery. Control relay 505 operates and at its contacts 508 completes an operating circuit for control relay 460B; at its contacts 506 completes a holding circuit over the start relay 511 independent of its associate relay 500; and at its contacts 507 interrupts the energizing circuit for the associate relay 500 which releases after an interval, and at its contacts 502 interrupts the holding circuit for control unit 460A to release same.

Control relay 460B at its contacts 509 completes an alternative energizing circuit for the upper electrode of the lamps; at its contacts 401b—430b connects the marking contacts 301—330 of the calling register to the marking conductors 331'—360' and at its contacts 431b—460b connects the marking contacts 331—360 of the called register to the conductors 301'—330'. Since the marking contacts 302, 313, 330, 333, 342 and 351 (representing a call AD0—DA1) are now connected to conductors 303', 312', 321', 332', 343' and 360', respectively, lamps 361—366 will extinguish and lamp 367 will effect operation of rate relay 389. Rate relay 389 operates to interrupt the energizing and holding circuits for the control arrangement to restore same.

It is apparent from the foregoing description that as a call is registered on the called and calling party registers, the control equipment effects the sequential operation of relays 460A and 460B, these relays in turn being operated at their contacts to connect positive potential to the lamp group 395' from the time of the initial operation of the control circuit 515 until its restoration. It is important to note that at no time during the transposition operation are the markings on he leads interrupted to thereby give a false indication that potential is absent on a marking lead. The nature of this operation will be more clearly understood if consideration is given to the operation of the lamps during the transposition operation. For simplicity of explanation, specific reference is made only to lamp 361 which, upon the operation of the first control relay 460A, is connected over contacts 401a to marking conductor 301'. As relay 460B operates, lamp 361 is connected to marking contacts 333. During the period which relay 460B is operated before the release of 460A, lamp 361 is connected for control over both marking contacts 303 and 333. With this arrangement it is apparent that at no time during the shift from one code lead to another is the connection from the lamp 361 to the code leads artificially interrupted.

Further arrangements, including the novel rate determination equipment of the invention, will be apparent from the foregoing description. For example, a lamp group, such as 395, may be connected to relay 389 to provide rate E in the case of calls by subscribers in exchange DA1(321) to subscribers in the exchange AD0(230); and a lamp group, such as 396, may be connected to relay 391 to provide rate F relative to calls in the opposite direction, that is, by subscribers in the exchange having code AD0(230) to subscribers in the exchange area having code DA1(321). The arrangement may also include the transposition arrangement of Figure 4 to provide a common rate for certain other calls in both directions.

In such arrangement lamp group 395 responds to calls from subscribers in the exchange having code DA1(321) to subscribers in the exchange having code AD0(230) upon the operation of relay 460A, and the operation of rate relay 389 opens its contacts 390 to release the control circuit, thereby preventing unnecessary reversal of the equipment. Lamp group 396 responds to calls from subscribers in the exchange having code AD0(230) to subscribers in the exchange having code DA1(321) responsive to the operation of relay 460A, and the operation of rate relay 391 opens its contacts to release the control circuit to prevent unnecessary reversal of the equipment.

In installations in which calls in both directions are assigned the same rate, series contacts of the rate relays may be inserted in the starting circuit shown in Figure 4 to present unnecessary reversals. If such reversals may be tolerated these contacts may be omitted, and the control circuit 515 may go through its cycle as indicated herein.

Alternatively, contacts such as 390 and 392 of the rate relays may be inserted in the positive potential supply for the plate electrodes of the lamp groups, as shown in the upper portion of Figure 4 at the point indicated by the legend M, instead of in the circuit from contacts 510 of the register start relay 511 and control circuit 515. In such event a reversal occurs, but the opening of the positive potential supply by a rate relay prevents it from operating a second rate relay in the cases where different rates apply to calls between two exchanges in different directions.

For a case in which a call from a subscriber in the exchange having code DA1(321) is initiated to a subscriber in an exchange having code AD0(230) is to be calculated at a certain rate, and a call in the opposite direction from subscribers in exchange having code AD0(330) subscribers in the exchange having code DA1(321), is to be a free service call, lamp group 395 would be connected for the first type of call, with terminal 368 strapped to terminal E for rate E, and lamp group 396 would be connected for the other calls in the other direction over terminal 378 to terminal F for rate F, which, however, would be designated as a zero rate.

There is set forth in Figure 5 an alternative control circuit arrangement for use with the arrangement of Figure 4. As in the previous arrangement, transposition of the conductors from one code lead to the other is effected without artificially disrupting the connections to the marking leads, and false indications of the nature of the markings on the conductors are prevented.

It will be apparent that the start relay 511 controls the start circuit for the control arrangement 515' in the manner of the previous embodiment. As the signal is applied by the register to the starting conductor for the control circuit 515' the control relay 460A is operated, and at its contacts effects connection of the marking contacts 301—330 and 331—360 to the marking leads 301'—330' and 331'—360' in the manner indicated hereinbefore, and at its contacts 461' completes an operating circuit for slow to operate relay 500'. After the elapse of a predetermined period of time, relay 500' operates, and at its contacts 501' completes an operating circuit for the transposition relay 460B which operates, and at its contacts 401b—430b connects the marking contacts 301—330 of the calling register to the marking conductors 331'—360' and effects connection of the marking contacts 331—360 of the called register to the marking conductors 301'—330', such connection being made during the period that the first control relay 460A is operated, whereby the possibility of a false indication during the period of transposition is eliminated.

Relay 460B at its contacts 461' completes an operating circuit for an associate relay 505' which operates after a brief delay, at its contacts 507 interrupts the holding circuit for the first control relay 460A to effect the restoration thereof, and at its contacts 506 completes a self-holding circuit which extends from negative battery over the winding of relay 505', contacts 506 and 510' to positive potential.

Relay 460A in restoring is effective at its contacts 461' to interrupt the holding circuit for relay 500' which restores, and at its contacts 502' removes the positive potential from all lamp units, such as 395 and 396, and at its contacts 501' interrupts the holding circuit for control relay 460B, which restores, and at its contacts 461' interrupts the energizing circuit for associated relay 505', the latter relay remaining held over the circuit which has been completed over the contacts of the rate relay and a register start relay. Relay 500 is slow to release. Accordingly, as relay 460A restores, the lamps remain energized for a period sufficient to make the reverse test prior to resoration of relay 500′. As the appropriate rate relays operate, relay 505′ is restored in an obvious manner.

It is apparent that in the event that a rate relay, such as illustrated relays 389, 391, etc., is operated as a result of the operation of the first rate determination relay 460A, the energizing circuit for the lamps will be interrupted at the corresponding contacts such as 390′, 392′ of the operated register relay. The control circuit will run its cycle but will be without effect relative to the lamp circuit.

Other types of control circuits for achieving such operation will be apparent to parties skilled in the art.

A further novel marking lamp arrangement is set forth in Figure 6. As there shown, each of the marking conductors 601′, 602′, etc., is normally connected over an associated resistor such as 651, 652, etc., to negative battery. Moreover, the register marking contacts, 601—620 are normally open, and each contact is adapted to connect 100 volts positive potential to its associated marking conductors as operated. The guard tubes 621, 622, etc., are arranged in the manner of the circuits in Figures 1A–5 with their cathode electrodes connected to the ones of the conductors which are associated with the code assigned thereto. The potential supply source for the plate electrodes of the marking tubes, such as 621, 622, etc., is in the order of 200 volts, and the resistors 626, 631, connected in the plate circuit, are in the order of 100,000 ohms. The resistors 651—670 which connect the marking leads to negative battery, are in the order of 1000 ohms, and the rate relays 181—193 are in the order of 10,000 ohms.

It will be apparent that under normal conditions the tubes 621, 622, 626, 627 will be fired by reason of the 200 volt potential differential which is applied to the plate and cathode electrodes of these tubes. Accordingly, the potential at point T for the first lamp group 690 will be approximately 62 volts positive potential, and guard tube 625, which has its plate connected to point T, will be extinguished in that the drop across the tube is less than is required to effect striking of the tube. Furthermore, at this potential, whether tube 625 is fired or non-fired, the current which passes through the rate relay 189 would be insufficient to operate same.

Assuming now, that a subscriber in an exchange having the code calling "2" initiates a call, and effects registration of the code digit 2 upon the calling exchange register, the register set will effect closure of contacts 602 to thereby extend a 100 volt positive potential to the marking conductor 602′, and the lower electrode of tube 621. Inasmuch as the second tube 622 of the guard arrangement is conducting at this time, the voltage at point T will remain at approximately 62 volts positive, and the difference (100−62=38 volts) will cause tube 621 to remain extinguished.

As the calling subscriber now dials the called exchange code digit "3" the appropriate register relay operates to effect closure of the contacts 613 to thereby extend 100 volt positive potential to the marking conductor 613′ and the cathode electrodes of the guard lamps which are connected thereto. Inasmuch as tube 622 was previously operated, the potential at point T is approximately 62 volts. Accordingly, as a 100 volts positive is now placed on the cathode, the differential will be in the nature of 38 volts, and the tube will be extinguished. At this time the voltage at point T tends to rise towards the value of a potential source J (in the present example 200 volts positive), and as it reaches the point where there is approximately a 70 volt drop across the tube 625 (which results in a differential of approximately 30 volts across tube 622), the differential will be sufficient to fire master tube 625 and the voltage at point T will now be in the order of 73 volts. Accordingly, the rate relay (in the present example, rate relay 189) connected to terminal E will be operated over the circuit extending from a potential source J over resistance 626, tube 625, and rate relay 189 to negative battery.

The reversal arrangements of Figures 4 and 5 may be utilized with Figure 6 by connecting same at the point indicated by the arrow in Figure 6 in an obvious manner. Inasmuch as the lamp group circuits such as 690, 695, are normally connected to open circuits as far as the register relay contacts are concerned, and are caused to function for rating in response to closing of the register relay contact circuits, any opening of circuits at point L would only be responded to as normal condition. Accordingly, the feature of the arrangement of the contacts of relays 460A and 460B is not a requirement.

While this arrangement is illustrated in connection with a rate determination system, it is apparent that it is also applicable to other arrangements such as the restriction and non-restriction and routing arrangements set forth hereinbefore.

*Rectifier marking circuit*

A further embodiment of the invention may be accomplished through the utilization of rectifier units in coincidence groups in much the manner that the glow tubes were used in the previous Figures 1–6.

Briefly, the register relays for the exchange codes control marking contacts 701—730 (Figure 7) in the manner of the previous disclosures to connect and to disconnect negative potential from marking conductors, such as the illustrated conductors 701′—730′. A first rectifier group 740 comprises rectifier elements 741—743 which have their conducting ends connected in multiple over resistor 744 to a positive potential source J. The blocking ends of the rectifier elements 741, 742, 743 are connected to various marking conductors in accordance with the particular code which is represented by the group. In Figure 7 it will be apparent that the rectifiers of group 740 are connected to cause same to be associated with the called exchange group AD1, and the rectifiers of group 750 are connected to cause same to be associated with the called exchange group DA1.

A master rectifier unit 745, 755 is associated with each of the rectifier groups 740, 750, the one end of the resistor-rectifier 745, 755 being connected over terminals V, W and over resistances 744, 754 to the positive potential source J, and the second end thereof being connected over a control relay, such as 760, to negative battery.

It is apparent that in the normal condition, current will flow from positive potential source J over resistor 744 and over the rectifiers 741, 742 and 743 of the group to conductors 702′, 713′ and 721′ and contacts 702, 713 and 721 to negative potential.

Assuming now that a subscriber dials the code of a subscriber in the exchange identified by code AD1, it is apparent from the foregoing description that the register relays will effect the operation of contacts 702, 713 and 721 to effect disconnection of the negative potential from the one side of the rectifiers 741, 742 and 743 of group 740.

As a result, current from the positive potential source J will now flow over resistor 744, rectifier 745 and the winding of relay 760 to negative potential, the values of resistor 744 and relay 760 being chosen to effect operation of relay 760 under such conditions. Control relay 760 operates and at its associated contacts 761, 762 effects the corresponding control operation desired. It is apparent that rectifiers 751, 752, 753 of group 750 will effect operation of control relay 760 in a similar manner whenever the exchange code DA1 is registered.

It is also obvious from the foregoing description that control relay 760 may be a restriction relay, a non-restriction relay, or an intercept relay, and that the adaptation may be readily modified for use in the restriction or non-restriction, interception, routing translator and rate determination arrangement shown in Figures 1A–5 inclusive.

*Day and night rate determination*

The novel arrangement of the invention may also be adapted for use in effecting selection of the day and night rate with a calling-called code, such arrangement being set forth in detail in Figures 8A and 8B. In the specific embodiment set forth thereat, the circuit sets up both day and night rates, the lower rate being disabled for the day rate and the higher rate being disabled at night.

With reference thereto, it will be apparent that the novel arrangement comprises calling code register means for controlling marking contacts 301—330 (Figure 8B) and called code register means for controlling marking contacts 331—360. The registers normally connect negative potential to marking conductors 301′—360′, and effect removal of such marking from the conductors in accordance with the nature of the calling and called exchange codes registered thereon.

Each set of marking lamp groups, such as <u>395</u>, comprises a combination of two sets of three lamps 361–363 and 364–366 assigned to the calling and called codes, respectively. A pair of master lamps, 367 and 367′, operate whenever the six lamps of the group are extinguished, and extend a signal over terminals 845 and 846 to the rate determination circuit 850, which, in turn, signals a computer 810 as to the value of the charge to be made, such charge varying with the identity of the exchanges involved in the connection.

Such charge is also modified in accordance with the nature of the signals provided by the night or day relays which, in one instance, are controlled by the tape reader 800, or calendar circuit 801. Specifically, if the equipment is used with a tape reader, the tape reader circuit 800 indicates to the rate determination circuit 850 the calls which are to be billed at the day rate and the calls which are to be billed at the night rate. In the event the equipment is used with an arrangement in which the charges are made at the completion of a ticketing call, the calendar clock circuit is used to control the night and day relays 805, 807 in the determination of the rate to be applied.

The rate determination circuit 850 controlled by the tape reader 800 and the marker groups <u>395</u>, <u>396</u> comprises a set of marking tubes 830, 835 and 840, etc., the number of which is dependent upon the number of different rates used in the system. The energizing circuits for the rate determining tubes are controlled by the marker groups <u>395</u>, <u>396</u>, etc., over terminals 845, 846, 847, etc. The set of rate relays 815, 820, 825 connected in the plate circuits of the rate tubes 830, 835, 840 respectively, are interconnected with each other by control circuits which are in turn controlled by the night and day relay 805, 807.

The operation of the equipment will be apparent from the following description in which a call is made by a subscriber in the exchange having the calling code DA1 to a subscriber in the exchange having the call code AD0.

As set forth in the description related to Figure 3, the lamps 361—366 will be normally energized, and the voltage at point N will be approximately 60 volts positive, which is insufficient to break down the gap of its master control tubes 367, 367′. Accordingly, the three marking tubes 830, 835 and 840 in the rate determination circuit 850, which have their control grids connected to terminals 845, 846 and 847, will likewise be extinguished (it being noted that each gap requires approximately 70 volts to effect breakdown of its tube).

Assuming now that the night rate relay 805 is operated, as the codes DA1—AD0 are registered upon the registers, the associated contacts 303, 312, 321, 332, 343 and 360 are operated to remove negative potential from the corresponding conductors and the lower electrodes of the tubes 361—366. The lamps of group <u>395</u> thereupon are extinguished, and the voltage of point N tends to rise towards value of the voltage of source J. As the potential drop across master guard tubes 367, 367′ reaches striking voltage, tube 367′ fires in series with the control gap of rate tube 830 and the lower winding of rate relay A, over a circuit extending from source J (200 volts positive potential), the 100,000 ohm resistor 369 at point N, the gap of tube 367′, terminal 368, terminal 845, the control gap of rate tube 830, the lower winding of rate relay 815(A), and contacts 806 of the night relay to negative potential. Inasmuch as substantially 200 volts potential exists across the series gaps of tubes 367′ and 830, and the firing potential is approximately 70 volts for tube 367′, and 70 volts for tube 830 (giving a total of approximately 140 volts), both of these tubes will fire.

As a result, the main gap of tube 830 fires, operating rate relay 815(A) over the circuit extending from source P (200 volts), the main gap of rate tube 830, the lower winding of relay 815(A), and contacts 806 to negative battery.

It is noted that the control gap of tube 835(B) and the rate relay 820(B) are in parallel with the control gap of tube 830(A) and the rate relay 815(A) through the contacts 811 of rate relay 815(A). The one megohm resistances between the cathodes and the control electrodes are for biasing purposes, and inasmuch as the value of these resistors is high in comparison to the others in the circuit, they are not considered in the description.

Tube 835 will fire in series with control tube 367 and rate relay B, the circuit extending from negative battery over contacts 806 and 811, the lower winding of relay 820, the control gap of tube 835, terminal 846, terminal 368, lamp 367, resistor 369, to the positive potential at point J. Rate relay 820(B) will try to operate, but with the operation of rate relay 815(A), contacts 811 will be opened, and the circuit for relay 820(B) will be disabled. Rate relay 815(A) at its contacts 817 is effective to indicate to the computer circuit 810 that rate A is to be applied.

Assuming that the day relay 807 had been operated as a result of the indications on the tape reader circuit 800 (or as a result of the signal from the calendar clock circuit 801) contacts 808 would be closed as the indication was received by the rate tubes 830(A) and 835(B), and in such case rate relay 820(B) will be energized over a circuit extending from source J, resistor 369, lamp terminals 368 and 846, the main control gap of rate tube 835(B), the upper winding of rate relay 820(B) and contacts 826 and 808 to negative battery.

Rate relay 815(A) will also be operated in that the control gap of tube 830(A) will have been connected over the upper winding of its rate relay 815(A) through contacts 822, 826, and 808 to the negative potential. However, as rate relay 820(B) operates, it is effective at its contacts 822 to disable rate relay 815(A), and at its contacts 823 indicates to the computer that rate B is to be applied.

It will be apparent from the foregoing description that the functioning of lamp group <u>396</u> responsive to the registration of the calling-called code AD0—DA2 will effect the extinguishment of master marking tube 810 and the energization of rate tubes 835 and 840 (B and C).

It is noted that resistances 830′, 835′, and 840′ are connected in the start circuits of each of the cold cathode tubes 830, 835, and 840. These resistor members are comparable in value with the resistor members 369, 379, etc., whereby the firing of one master tube of a group of master tubes, such as 367, 367′, 377 and 377′, will not inhibit firing of the other tubes in the group.

*Alternative day night determination circuit*

An alternative arrangement to that set forth in the upper portion of Figures 8A and 8B is set for in Figure 9.

As there shown, various lamp groups, such as X, Y, and Z are connected in the manner of the lamp groups 395 and 396 of Figure 8 to control rate tubes 905(X'), 915, 925 (Y', Y''), 930, 940 (Z', Z'') and rate relays 910(A), 920(B), and 935(C) to indicate to the computer equipment 810' the value of the rate to be charged. In the arrangement illustrated, the connections are such that both day and night calls to exchange X are charged at rate A; calls to exchange Y are charged at rate B for nights and rate C for days; and calls to exchange Z are charged at rate C for days and rate C for nights. Other possible rate applications are obvious from such description.

As in the arrangement of Figures 8A and 8B, the day and night indication may be provided by a tape reader circuit 800 or a calendar and clock arrangement 801. A common relay 900 is arranged at its contacts 901, 902 to, at times, condition the day rate equipment for operation and at other times condition the night rate equipment for operation.

Assuming now that rate A is so low that the day and night rate is the same, as the code combination which effects the operation of lamp group X is registered, guard lamps 961—966 extinguish, and the resultant striking of the guard tube 967 associated therewith will cause a potential to be applied to the control gap of day and night control tube 905 to cause same to strike, and thereby effect operation of rate relay 910(A). Rate relay 910(A) operates, and at its contacts 911 indicates to the computer that the rate "A" is to be applied.

Assuming now that rates "B" and "C" are high enough that they may be used alternatively as day or night rates, as the exchange code associated with group Y is registered, guard lamps 971—976 extinguish and one of the master guard or marking tubes 969 and 970 will strike, depending upon whether the night rate or the day rate is in effect.

That is, as noted heretofore, the tape reader circuit 800 or calendar circuit 801 determines the position of the day and night relay 900. Assuming that the tape reader circuit 800 (or calendar or clock circuit 801) indicates that the day rate is to be applied, contacts 901 are closed to connect positive battery to the plate electrodes of the rate tubes 915 (day rate B) and 930 (day rate C) and these tubes are therefore prepared for operation. Alternatively, if the tape reader circuit 800 indicates that the night rate is to apply, the contacts 902 are closed to condition the rate tubes 925 (night rate B), 940 (night rate C) for operation.

It is apparent then, that as a call between the exchanges having the codes assigned to lamp group Y is registered, marking tubes 971—976 will be extinguished and tubes 969 and 970 will attempt to fire in series with their respective rate tubes 925, 930 and rate relays 920, 935. Inasmuch as the day rate is assumed to be in effect, the potential applied to the plate electrode of rate tube 930 will cause the main gap of tube 930 to fire and rate relay 935(C) will be operated in series therewith over a circuit extending from positive potential over contacts 901, tube 930, winding of relay 935(C) to negative battery.

The values of resistors 945', 915', 925', 930', and 940', which are connected in series with the starters of each of the cold cathode tubes (905, 915, 925, 930 and 940), are comparable with the values of resistors 960, 968, 977, so that the voltage use will not be limited at points X'', Y'', and Z''. As a result, the firing of one of the master lamps will not inhibit the firing of another of the lamps in the group.

Alternatively, if the night rate is in effect as a call between the exchanges associated with lamp group Y is registered, lamps 971—976 are extinguished, and marking lamp 969 fires in series with the control gap of rate tube 925, the circuit extending from positive battery over resistor 968, control tube 969, the control gap of tube 925, the winding of rate relay 920(B), to negative battery. In that it has been assumed that the night rate is applicable, positive potential applied to the plate electrode of rate tube 925 will cause the main gap of the rate tube 925 to fire, and an operating circuit will be completed for the rate relay 920(B) which extends from positive battery over contacts 902, rate tube 925, and the winding of rate relay 920(B), to negative battery.

It will be apparent from the foregoing description that with the establishment of a call between the exchanges associated with lamp group Z, the lamps 978—983 will be extinguished and one of the marker lamps 984, 985 will be operated, depending upon whether the day or the night rate is in effect. Assuming the day rate is in effect, the marking lamp 984 will effect the operation of rate tube 930 and the energization of rate relay 935 (rate C). Assuming the night rate is in effect, the marking lamp 985 will fire and effect firing of the rate tube 940, whereby rate relay 935 (rate C) is energized.

I claim:

1. A marking arrangement comprising register means for registering incoming plural character codes, a plurality of groups of conductor members, each of which groups is connected to mark the value of an individual one of the code characters; means controlled by said register means operative responsive to the receipt of an incoming code to mark the one member of each group which corresponds to the value of each associated character; indicating means for each code each of which comprises a nonlinear device for each character in its code having a first and a second operating condition; means connecting each nonlinear device to its associated conductor member in its associated group for operation of the device to its first condition and for operation to said second condition responsive to registration of its individual character on its associated conductor member, and a master guard device connected to the indicating devices for each of a plurality of codes which is operative only responsive to the concurrent registration of each of the codes on the conductor members and the operation of each of said nonlinear devices to said second condition.

2. A marking arrangement comprising register means for registering plural character codes, a plurality of groups of conductor members, each of which groups is connected to mark the value of an individual one of the characters of each code as received; means controlled by said register means to mark the conductor of each group which corresponds to the value of the one of the code characters which is assigned to such group, and indicating means for each code comprising a nonlinear device for each character in the code, each of which is connected to the conductor of the group which is assigned to represent the same code character, a plurality of master devices for each code connected to the nonlinear devices for such code operated only responsive to operation of each of said nonlinear devices responsive to the registration of the code on the conductor members connected to the associated nonlinear devices, a plurality of switching circuits, and circuit means connecting each master device of a plurality for a code to a different switching circuit to effect energization of said switching circuits only responsive to the concurrent operation of each master device of the plurality connected thereto.

3. A marking arrangement comprising register means for registering plural character codes, a plurality of groups of conductor members, each of which groups is connected to mark the value of an individual one of the characters as each code is received; means controlled by said register means to mark the conductor member of each group which corresponds to the value of the one of the received code characters which is assigned to the group; indicating means for each code comprising a set of nonlinear devices, each of which nonlinear devices is assigned to represent the value of one character in the code and is connected to the conductor member of the group which represents such character value, a plurality of master devices, means connecting at least a pair of said sets of nonlinear devices to provide a predetermined output signal to said plurality of master devices only responsive to the operation of each of the nonlinear devices of said certain sets to a predetermined condition, a plurality of switching circuits, and circuit means connecting each of said master devices to a different switching circuit to effect the operation thereof only responsive to the coupling of said predetermined output signal to said plurality of master devices.

4. In an automatic telephone system in which rate determination equipment is used to determine the rate to be charged for calls extended between exchanges, and in which different rates are charged for calls between different exchanges, said equipment comprising register means including a first register set for registering the identity of the called exchange code; a second register set for registering the identity of the calling exchange code, each of said sets comprising a plurality of groups of marking members, the different groups of each set being connected to mark the value of the different digits of the code assigned thereto; means controlled by each of said register sets with receipt of their respective codes to mark the one member of each group in its set which corresponds to the value of the digit assigned for registration thereby; a plurality of rate setting means, each of which is operative to set a different rate as energized, and recognition means operatively controlled by said first and second register sets responsive to the registration of different calling exchange codes and called exchange codes thereon to effect the operation of correspondingly different ones of the rate setting devices.

5. In an automatic telephone system in which rate determination equipment is used to determine the rate to be charged for calls extended between exchanges and in which different rates are charged for calls between different exchanges, said equipment comprising register means including a first register set for registering the identity of the calling exchange code; a second register set for registering the identity of the called exchange code, each of said sets comprising a number of groups of marking members, the different groups of each set being connected to mark the value of the different digits of its associated code; means controlled by each of said register sets responsive to receipt of their respective codes to mark the one member of each group in its set which corresponds to the value of the digit to be registered thereby; a plurality of rate setting means, each of which is operative to set a different rate as energized; and recognition means for effecting operation of the rate setting device corresponding to the rate which has been assigned to calls made between the registered exchanges comprising a first set of devices for the calling exchange code and a second set of devices for the called exchange code the devices of each set being connected to the corresponding ones of said group members to operate only responsive to the marking of the members in each of the groups which are associated with the two codes, and a single master device connected to said first and second devices to select the one of the rate setters preassigned thereto only in response to the operation of each of the devices of both of its associated sets.

6. An arrangement as set forth in claim 5 which includes means for connecting different master devices representing different calling-called exchange codes to different rate setting devices.

7. An arrangement as set forth in claim 5 in which each calling-called code is represented by a set of six nonlinear devices, three of which are connected to represent the called exchange code and three of which are connected to represent the calling exchange code, and in which said master device is connected to operate to set the rate only with operation of its associated six nonlinear devices.

8. An arrangement as set forth in claim 5, which includes means for connecting each of said sets associated with a calling and called code to operate responsive to the extension of calls between the exchanges in either direction.

9. In an automatic telephone system in which rate determination equipment is used to determine the rate to be charged for calls extended between exchanges, and in which different rates are charged for calls between different exchanges, said equipment comprising register means including a first register set for registering the called exchange code; a second register set for registering the calling exchange code, a plurality of rate setting means, each of which is operative to set a different rate as energized, and recognition means for each calling-called exchange code combination connected to said first and second register sets, operative to set the rate setting device corresponding to the rate which has been assigned to such calls different recognition means being connected to represent different code combinations, each of said recognition means comprising a first set of devices which is operative only responsive to the registration of the called exchange code of its assigned combination on the first register set, a second set of devices operative only responsive to registration of the calling exchange code of its assigned combination on the second register set, and a single master member for effecting operation of the rate device which represents the rate assigned thereto only with operation of each device in its first and second associated sets.

10. An arrangement as set forth in claim 9 in which said telephone system includes a scanner unit for reading a tape member having toll ticketing information including at least the calling and called exchange code recorded thereon, and means for transmitting said information as read to said register means for rate determination purposes.

11. An arrangement as set forth in claim 9 which includes toll ticketing equipment including recording means, and means for connecting the output of said rate setting means to said recording means in said toll ticketing equipment for recording purposes.

12. An arrangement as set forth in claim 9 which includes means for rendering each of said first and second register sets associated with a calling and called code operative responsive to extension of calls between the exchanges in either direction, and means for rendering said recognition means for a combination operative responsive to the establishment of a connection between the exchanges of the combination in either direction.

13. In an automatic telephone system in which rate determination equipment is used to determine the rate to be charged for calls extended between exchanges and in which different rates are charged for calls between different exchanges, said equipment comprising register means including a first register set for registering the called exchange code; a second register set for registering the calling exchange code, each of said sets comprising a number of groups of marking members, the different groups of each set being assigned to mark the value of the different digits of its associated code; means controlled by each of said register sets with receipt of their respective codes to mark the one member of each group in its set which corresponds to the value of the digit to be registered thereby; a plurality of rate setting means each of which is operative to activate a different rate device as energized, and recognition means for effecting operation of the rate setting device corresponding to the rate which has been assigned to calls made between such exchanges comprising a first set of nonlinear devices connected to the marking members which normally represent the calling exchange of the combination, a second set of nonlinear devices connected to the marking members which normally represent the called exchange code of the combination, and a master means operative responsive to operation of each of said member devices in each set to operate the appropriate rate setting device; and transposition means for connecting the calling register to said marking members normally associated with the called register and the called register to said marking members normally associated with the calling register whereby the sets representing each combination are operative for calls extended in both directions.

14. An arrangement as set forth in claim 13 in which said marking members are normally marked with a predetermined potential, and in which said transposition means includes means operative to effect transposition of the connections without interrupting the existing markings on marking members.

15. In an automatic telephone system in which rate determination equipment is used to determine the rate to be charged for calls extended between exchanges, and in which different rates are charged for calls between different exchanges, said equipment comprising register means including a first register set for registering the called exchange code; a second register set for registering the calling exchange code, recognition means for each calling-called exchange code combination different recognition means being connected to represent different combinations, each recognition means comprising a first set of code recognition devices connected to said register set operative only responsive to the registration of the called exchange of the combination on said first register set, a second set of code recognition devices connected to said second register set operative only responsive to the registration of the calling exchange of the combination on said second register set, and a plurality of sets of master members connected to said first and second register sets operative only responsive to operation of each device of its associated sets recognition devices; a plurality of rate setting devices, rate means for preparing different ones of said rate setting devices for operation with the occurrence of different predetermined conditions, and means operatively controlled by each set of master members as operated to effect operation of the one of the rate setting devices prepared for operation.

16. In an automatic telephone system in which rate determination equipment is used to determine the rate to be charged for calls extended between exchanges and in which different rates are charged for calls between different exchanges, said equipment comprising register means including a first register set for registering the called exchange code; a second register set for registering the calling exchange code, recognition means for each calling-called exchange code combination comprising a first set of code recognition devices operative only responsive to the registration of the calling exchange of the combination, a second set of code recognition devices operative only responsive to the registration of the called exchange of the combination, and a set of master members operative only with operation of each device of its associated sets of code recognition devices, a plurality of rate setting devices, and a first rate means operatively controlled by said master members to select different ones of said rate setting devices for operation responsive to the recognition of different ones of said codes on said register means, and a second rate means including time-of-day means for indicating alternatively a day and a night rate condition, and control means for adjusting the rate selected by said first rate means in accordance with the condition indicated as existing by said time of day means.

17. An arrangement as set forth in claim 16 in which said first rate means comprises at least a first switching set for assigning a first rate and a second switching set for assigning a second rate, and means for energizing said first and second switching sets responsive to energization of the master members of a combination which is to be assigned one of said rates.

18. An arrangement as set forth in claim 16 in which said first rate means includes a plurality of switching sets, each of which comprises a cold cathode tube connected for control by the master members of the combinations which are to be assigned the rate represented thereby, and a relay member for establishing a preassigned rate connected for control by the associated cold cathode member; and in which said time-of-day means includes selection means connected to select one of said switching sets operated in the combination for operation in accordance with the existence of day and night conditions.

19. An arrangement as set forth in claim 18 which includes means interconnecting the circuits for said switching means to effect disablement of the one switching set of combination which is not selected by the other switching set of the combination which is selected.

References Cited in the file of this patent

UNITED STATES PATENTS

| | | |
|---|---|---|
| 2,025,880 | McDavitt | Dec. 31, 1935 |
| 2,225,386 | Hebel | Dec. 17, 1940 |
| 2,402,700 | Williams | June 25, 1946 |
| 2,404,654 | Potts | July 23, 1946 |
| 2,437,118 | Ostline | Mar. 2, 1948 |
| 2,519,867 | Wicks | Aug. 22, 1950 |
| 2,543,022 | Horwitz | Feb. 27, 1951 |
| 2,544,944 | Wicks | Mar. 13, 1951 |
| 2,579,729 | Dehn et al. | Dec. 25, 1951 |
| 2,588,684 | Stehlik | Mar. 11, 1952 |
| 2,590,262 | McAlphine | Mar. 25, 1952 |
| 2,609,498 | Bachelet et al. | Sept. 2, 1952 |
| 2,631,195 | Ostline | Mar. 10, 1953 |
| 2,678,409 | Holden | May 11, 1954 |
| 2,686,838 | Dehn | Aug. 17, 1954 |
| 2,865,998 | Newstedt | Dec. 3, 1958 |